(12) United States Patent
Buia et al.

(10) Patent No.: US 7,500,143 B2
(45) Date of Patent: Mar. 3, 2009

(54) SYSTEMS AND METHODS FOR MANAGING AND ANALYZING FAULTS IN COMPUTER NETWORKS

(75) Inventors: Christopher A. Buia, Dover, NH (US); Thomas S. Pantelis, Portsmouth, NH (US); David K. Taylor, Durham, NH (US); Scott Ball, Newmarket, NH (US); Nathaniel J. Rockwell, Chester, NH (US)

(73) Assignee: Computer Associates Think, Inc., Islandia, NY (US)

( * ) Notice: Subject to any disclaimer, the term of this patent is extended or adjusted under 35 U.S.C. 154(b) by 370 days.

(21) Appl. No.: 10/258,907

(22) PCT Filed: May 7, 2001

(86) PCT No.: PCT/US01/14557

§ 371 (c)(1),
(2), (4) Date: Oct. 29, 2002

(87) PCT Pub. No.: WO01/86443

PCT Pub. Date: Nov. 15, 2001

(65) Prior Publication Data

US 2004/0078683 A1 Apr. 22, 2004

Related U.S. Application Data

(60) Provisional application No. 60/202,296, filed on May 5, 2000, provisional application No. 60/202,299, filed on May 5, 2000, provisional application No. 60/202,298, filed on May 5, 2000.

(51) Int. Cl.
G06F 11/00 (2006.01)

(52) U.S. Cl. ...................................... 714/26

(58) Field of Classification Search .................. 714/4, 714/43, 25, 26
See application file for complete search history.

(56) References Cited

U.S. PATENT DOCUMENTS

| 4,827,411 | A | 5/1989 | Arrowood et al. | 707/206 |
|---|---|---|---|---|
| 5,127,005 | A | 6/1992 | Oda et al. | 714/26 |
| 5,159,685 | A | 10/1992 | Kung | 395/575 |
| 5,261,044 | A | 11/1993 | Dev et al. | 395/159 |
| 5,295,244 | A | 3/1994 | Dev et al. | 395/161 |
| 5,297,138 | A | 3/1994 | Black | 370/254 |

(Continued)

OTHER PUBLICATIONS

Harry Newton, Newton's Telecom Dictionary, 2004, CMP Books, Twentieth Edition, p. 491.

(Continued)

Primary Examiner—Bryce P. Bonzo
Assistant Examiner—Amine Riad
(74) Attorney, Agent, or Firm—Pillsbury Winthrop Shaw Pittman LLP

(57) ABSTRACT

A system (100) for analyzing a fault includes a fault object factory (110) constructed and arranged to receive fault data and create a fault object (112), and a fault diagnosis engine (101) constructed and arranged to perform root cause analysis of the fault object. The system may further include a fault detector (130) constructed and arranged to detect the fault data in a monitored entity, a fault repository (140) constructed and arranged to store and access the fault object; and a fault handler (150) constructed and arranged to be triggered by the fault diagnosis engine to analyze the fault object.

21 Claims, 19 Drawing Sheets

U.S. PATENT DOCUMENTS

| | | | | |
|---|---|---|---|---|
| 5,317,725 A | | 5/1994 | Smith et al. | 714/27 |
| 5,367,667 A | | 11/1994 | Wahlquist et al. | 395/575 |
| 5,377,196 A | | 12/1994 | Godlew et al. | 371/20.1 |
| 5,436,909 A | | 7/1995 | Dev et al. | 371/20.1 |
| 5,521,910 A | | 5/1996 | Matthews | 370/54 |
| 5,539,877 A | * | 7/1996 | Winokur et al. | 714/26 |
| 5,559,955 A | | 9/1996 | Dev et al. | 395/182.02 |
| 5,568,491 A | * | 10/1996 | Beal et al. | 714/746 |
| 5,590,120 A | | 12/1996 | Vaishnavi et al. | 370/254 |
| 5,608,874 A | | 3/1997 | Ogawa et al. | 395/200.15 |
| 5,627,819 A | | 5/1997 | Dev | 370/250 |
| 5,649,103 A | | 7/1997 | Datta et al. | 395/200.03 |
| 5,666,481 A | * | 9/1997 | Lewis | 714/4 |
| 5,675,741 A | | 10/1997 | Aggarwal | 395/200.12 |
| 5,684,800 A | | 11/1997 | Dobbins et al. | 370/401 |
| 5,687,290 A | | 11/1997 | Lewis | 395/3 |
| 5,691,917 A | | 11/1997 | Harrison | 717/6 |
| 5,696,486 A | | 12/1997 | Poliquin et al. | 340/506 |
| 5,706,436 A | | 1/1998 | Lewis et al. | 395/200.11 |
| 5,727,157 A | | 3/1998 | Orr | 395/200.54 |
| 5,729,685 A | | 3/1998 | Chatwani et al. | 709/224 |
| 5,734,642 A | | 3/1998 | Vaishnavi et al. | 370/255 |
| 5,734,824 A | | 3/1998 | Choi | 395/200.11 |
| 5,748,781 A | | 5/1998 | Datta et al. | 382/232 |
| 5,751,965 A | | 5/1998 | Mayo et al. | 395/200.54 |
| 5,751,967 A | | 5/1998 | Raab et al. | 709/228 |
| 5,768,501 A | | 6/1998 | Lewis | 395/185.01 |
| 5,777,549 A | | 7/1998 | Arrowsmith et al. | 340/506 |
| 5,787,234 A | | 7/1998 | Molloy | 395/51 |
| 5,793,362 A | | 8/1998 | Matthews et al. | 395/200.54 |
| 5,809,282 A | | 9/1998 | Cooper et al. | 709/226 |
| 5,822,302 A | | 10/1998 | Scheetz et al. | 370/245 |
| 5,832,503 A | | 11/1998 | Malik et al. | 707/104 |
| 5,850,397 A | | 12/1998 | Raab et al. | 370/254 |
| 5,864,662 A | | 1/1999 | Brownmiller et al. | 714/43 |
| 5,872,911 A | | 2/1999 | Berg | 714/43 |
| 5,889,953 A | | 3/1999 | Thebaut et al. | 395/200.51 |
| 5,907,696 A | | 5/1999 | Stilwell et al. | 395/500 |
| 5,926,463 A | | 7/1999 | Ahearn et al. | 370/254 |
| 5,951,649 A | | 9/1999 | Dobbins et al. | 709/238 |
| 5,987,442 A | | 11/1999 | Lewis et al. | 706/10 |
| 6,003,090 A | | 12/1999 | Puranik et al. | 709/235 |
| 6,006,016 A | * | 12/1999 | Faigon et al. | 714/48 |
| 6,009,440 A | | 12/1999 | Watson et al. | 707/203 |
| 6,012,152 A | | 1/2000 | Douik et al. | 714/26 |
| 6,014,697 A | | 1/2000 | Lewis et al. | 709/223 |
| 6,026,442 A | | 2/2000 | Lewis et al. | 709/229 |
| 6,026,500 A | | 2/2000 | Topff et al. | 714/26 |
| 6,032,184 A | | 2/2000 | Cogger et al. | 709/223 |
| 6,041,383 A | | 3/2000 | Jeffords et al. | 710/200 |
| 6,049,828 A | | 4/2000 | Dev et al. | 709/224 |
| 6,055,561 A | | 4/2000 | Feldman et al. | 709/200 |
| 6,064,304 A | | 5/2000 | Arrowsmith et al. | 340/506 |
| 6,069,895 A | | 5/2000 | Ayandeh | 370/399 |
| 6,072,777 A | | 6/2000 | Bencheck et al. | 370/244 |
| 6,079,020 A | | 6/2000 | Liu | 713/201 |
| 6,084,858 A | | 7/2000 | Matthews et al. | 370/238 |
| 6,101,180 A | | 8/2000 | Donahue et al. | 370/352 |
| 6,101,500 A | | 8/2000 | Lau | 707/103 |
| 6,112,251 A | | 8/2000 | Rijhsinghani | 709/249 |
| 6,115,362 A | | 9/2000 | Bosa et al. | 370/248 |
| 6,131,112 A | | 10/2000 | Lewis et al. | 709/207 |
| 6,141,720 A | | 10/2000 | Jeffords et al. | 710/200 |
| 6,141,777 A | | 10/2000 | Cutrell et al. | 714/47 |
| 6,147,995 A | | 11/2000 | Dobbins et al. | 370/392 |
| 6,158,011 A | | 12/2000 | Chen et al. | 713/201 |
| 6,173,399 B1 | | 1/2001 | Gilbrech | 713/153 |
| 6,185,619 B1 | | 2/2001 | Joffe et al. | 709/229 |
| 6,195,349 B1 | | 2/2001 | Hiscock et al. | 370/360 |
| 6,199,172 B1 | | 3/2001 | Dube et al. | 714/4 |
| 6,205,488 B1 | | 3/2001 | Casey et al. | 709/238 |
| 6,205,563 B1 | | 3/2001 | Lewis | 714/47 |
| 6,208,649 B1 | | 3/2001 | Kloth | 370/392 |
| 6,216,168 B1 | | 4/2001 | Dev et al. | 709/245 |
| 6,230,194 B1 | | 5/2001 | Frailong et al. | |
| 6,233,623 B1 | | 5/2001 | Jeffords et al. | 709/316 |
| 6,252,852 B1 | | 6/2001 | Rowles et al. | 370/242 |
| 6,296,330 B1 | | 10/2001 | Hall | 305/180 |
| 6,324,590 B1 | | 11/2001 | Jeffords et al. | 709/316 |
| 6,338,092 B1 | | 1/2002 | Chao et al. | 709/236 |
| 6,345,239 B1 | | 2/2002 | Bowman-Amuah | 703/6 |
| 6,349,306 B1 | | 2/2002 | Malik et al. | 707/103 |
| 6,377,987 B1 | | 4/2002 | Kracht | 709/220 |
| 6,392,667 B1 | | 5/2002 | McKinnon et al. | 345/738 |
| 6,393,386 B1 | | 5/2002 | Zager et al. | 703/25 |
| 6,408,312 B1 | | 6/2002 | Forthman et al. | 707/203 |
| 6,421,719 B1 | | 7/2002 | Lewis et al. | 709/224 |
| 6,549,932 B1 | | 4/2003 | McNally et al. | 709/202 |
| 6,580,693 B1 | | 6/2003 | Chernyak et al. | 370/248 |
| 6,581,166 B1 | | 6/2003 | Hirst et al. | 714/4 |
| 6,604,208 B1 | | 8/2003 | Gosselin et al. | 714/4 |
| 6,654,914 B1 | * | 11/2003 | Kaffine et al. | 714/43 |
| 6,694,314 B1 | | 2/2004 | Sullivan et al. | 707/10 |
| 6,876,993 B2 | | 4/2005 | LaButte et al. | 706/47 |
| 7,043,661 B2 | * | 5/2006 | Valadarsky et al. | 714/4 |
| 7,103,807 B2 | | 9/2006 | Bosa et al. | 714/43 |
| 7,111,205 B1 | | 9/2006 | Jahn et al. | 714/47 |
| 2002/0133328 A1 | | 9/2002 | Bowman-Amuah | 703/22 |
| 2002/0133756 A1 | | 9/2002 | Jain | 714/43 |
| 2003/0069972 A1 | | 4/2003 | Yoshimura et al. | 709/226 |
| 2003/0149919 A1 | | 8/2003 | Greenwald et al. | 714/43 |
| 2004/0078683 A1 | | 4/2004 | Buia et al. | 714/37 |

OTHER PUBLICATIONS

Microsoft Computer Dictionary, 2002, Microsoft Press, Fifth Edition, p. 291.

Peregrine Systems Partners with Motive Communications to Offer IT Solutions that Enhance Employee Self-Service, 1999, Peregrine Systems, Inc., 4 pages.

* cited by examiner

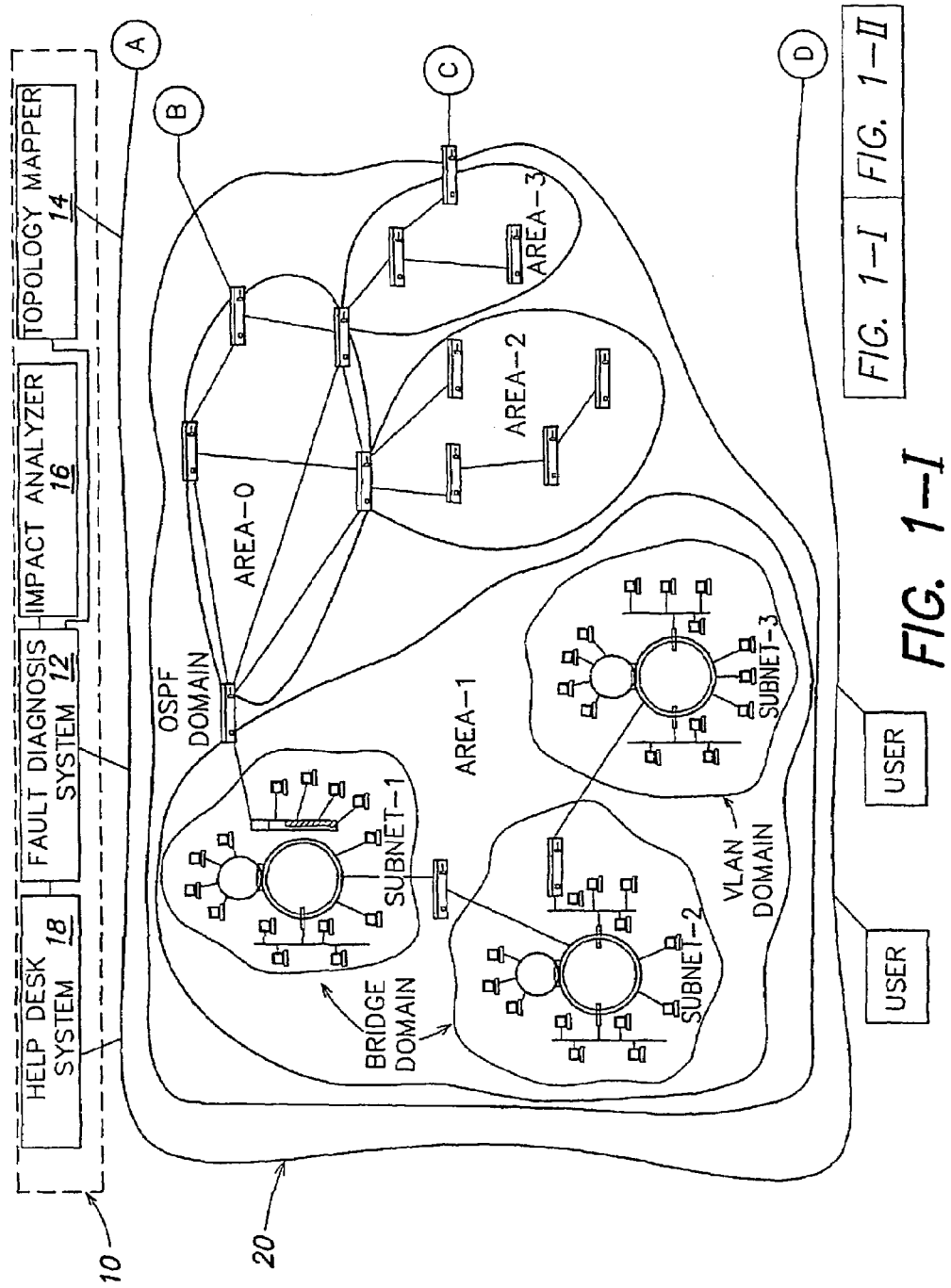
FIG. 1-I

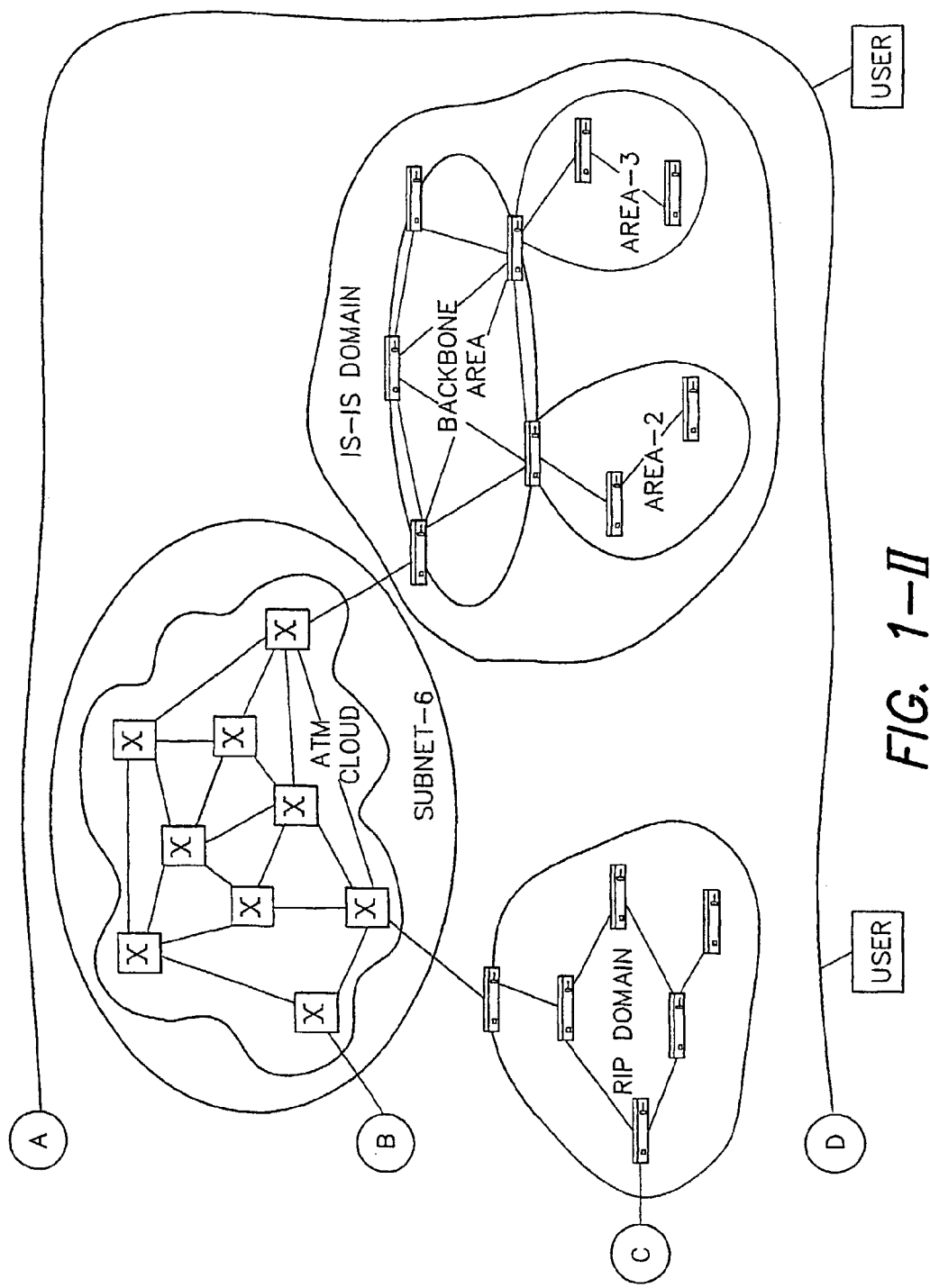
FIG. 1-II

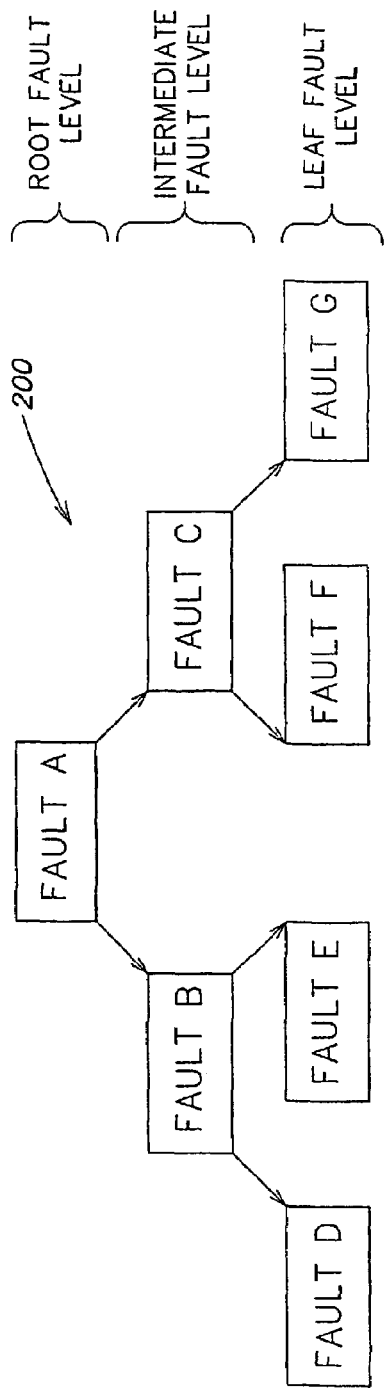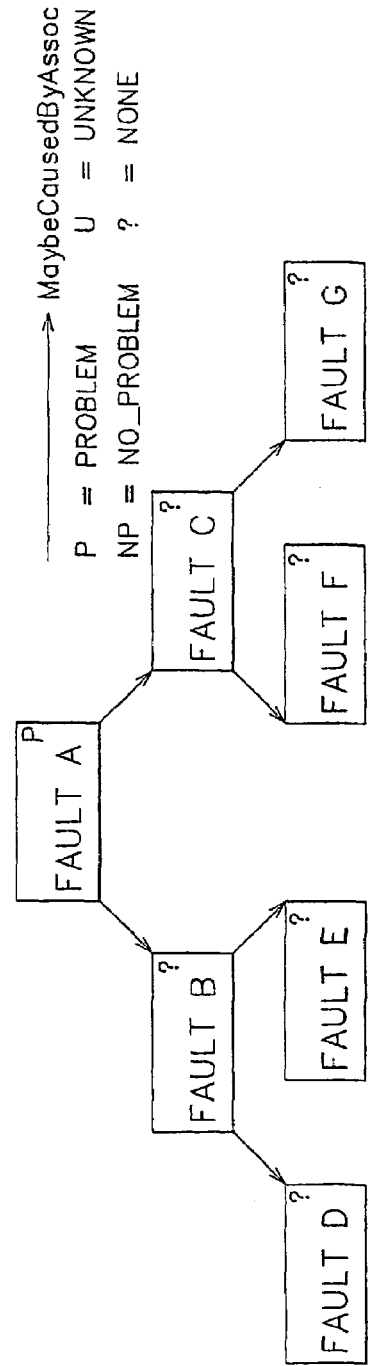

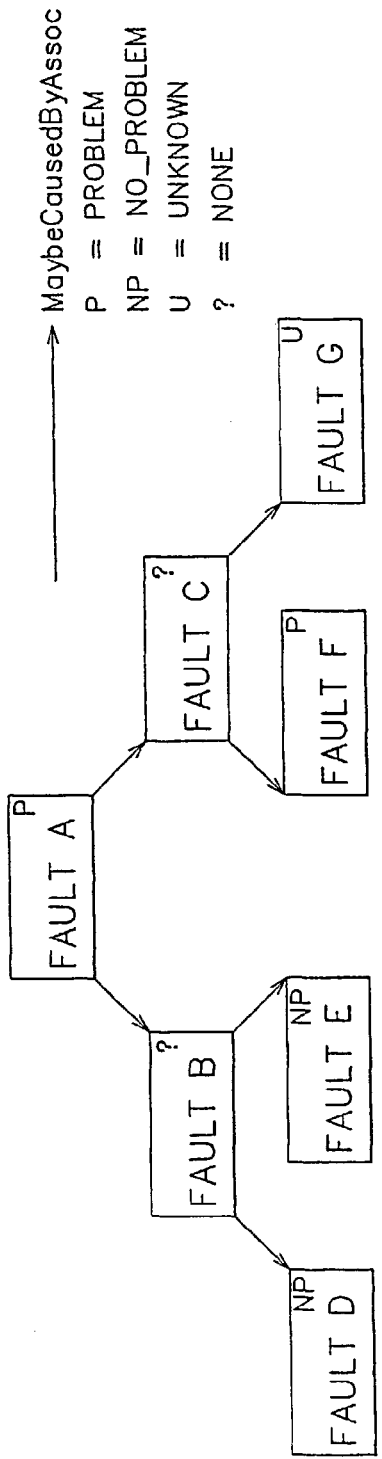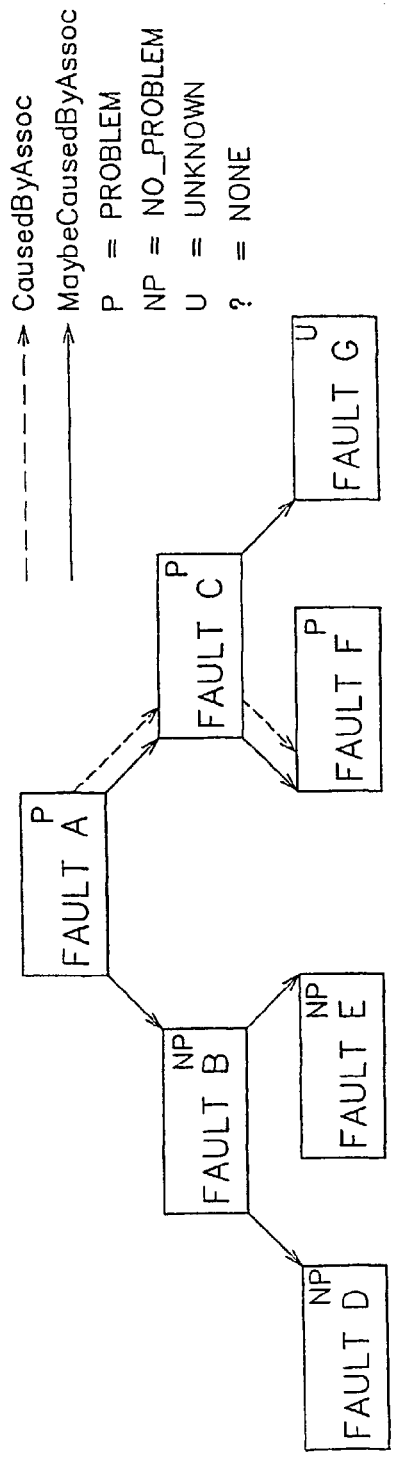

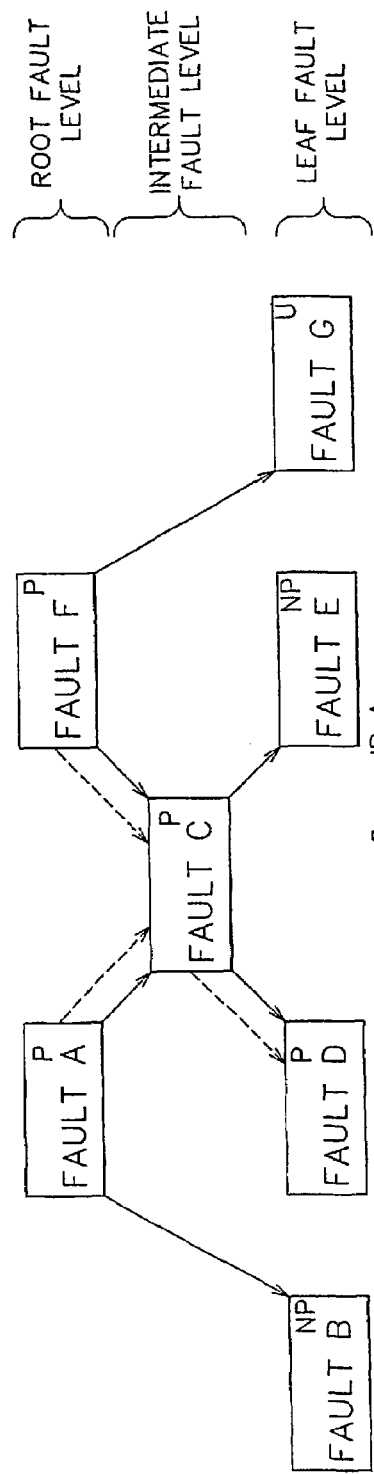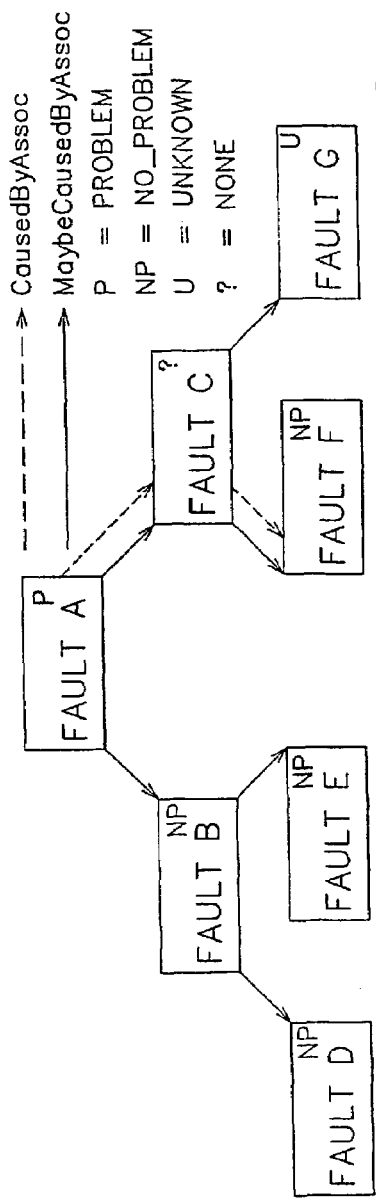

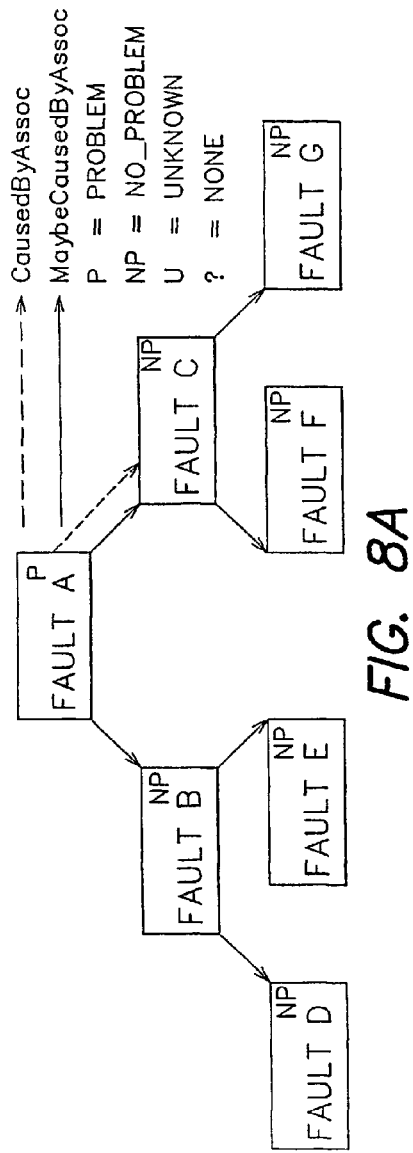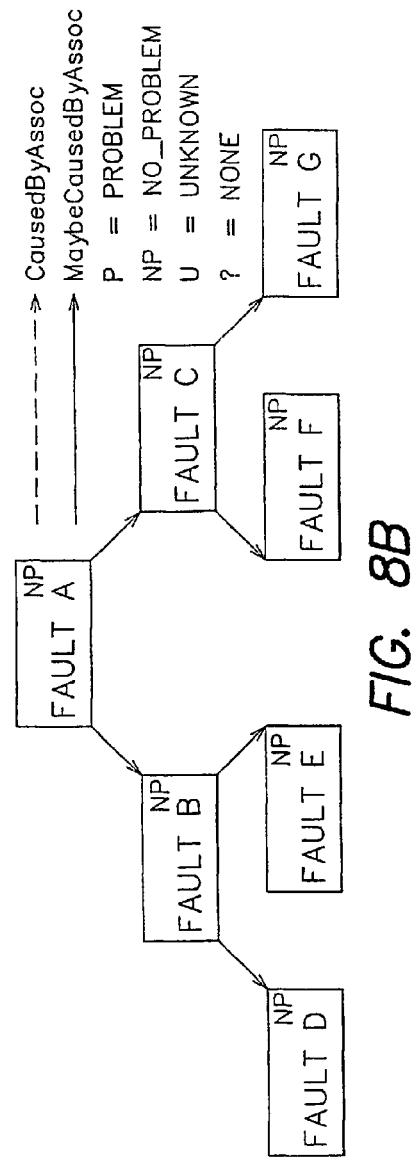
FIG. 8A
FIG. 8B

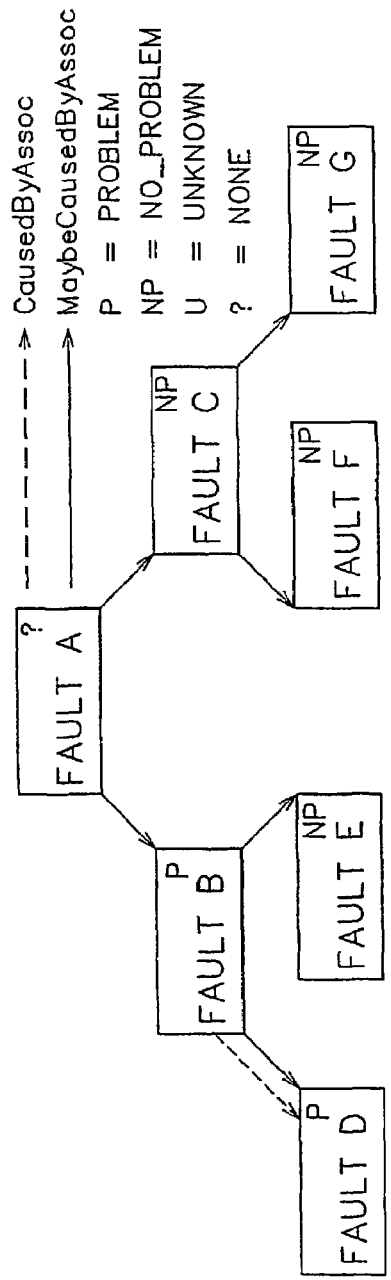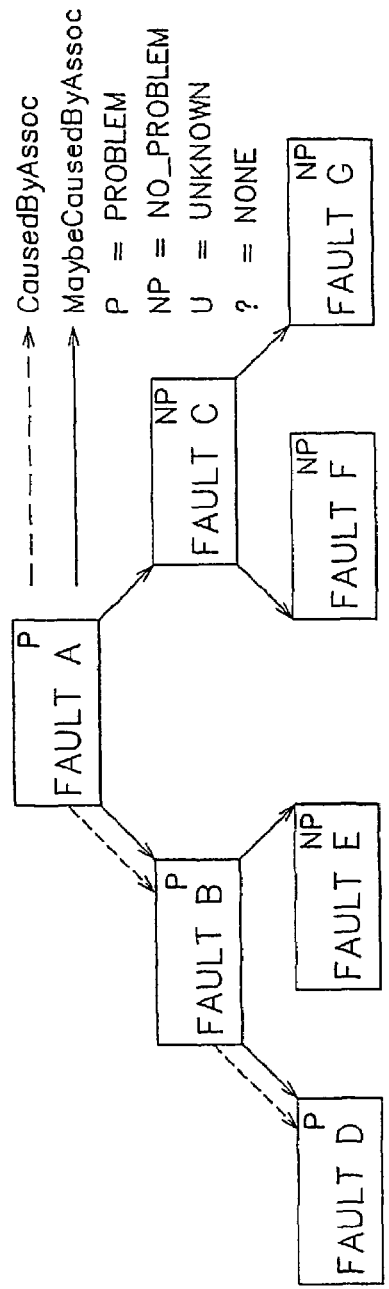
FIG. 8C
FIG. 8D

SYSTEMS AND METHODS FOR MANAGING AND ANALYZING FAULTS IN COMPUTER NETWORKS

This application claims priority from U.S. Provisional Application 60/202,296, entitled "Construction of a Very Rich, Multi-layer Topological Model of a Computer Network for Purposes of Fault Diagnosis," filed on May 5, 2000, and claims priority from U.S. Provisional Application 60/202,299, entitled "A method for diagnosing faults in large multi-layered environments guided by path and dependency analysis of the modeled system," filed on May 5, 2000, and claims priority from U.S. Provisional Application 60/202,298, filed on May 5, 2000, entitled "Method and apparatus for performing integrated computer network, system, and application fault management," all of which are incorporated by reference in their entireties.

GENERAL DESCRIPTION

The present invention relates a fault management and diagnosis system with a generic, easily extensible architecture.

The construction of computer networks started on a large scale in the 1970's. Computer networks link personal computers, workstations, servers, storage devices, printers and other devices. Historically, wide area computer networks (WANs) have enabled communications across large geographic areas, and local area networks (LANs) communications at individual locations. Both WANs and LANs have enabled sharing of network applications such as electronic mail, file transfer, host access and shared databases. Furthermore, WANs and LANs have enabled efficient transfer of information, and sharing of resources, which in turn increased user productivity. Clearly, communications networks have become vitally important for businesses and individuals.

Communications networks usually transmit digital data in frames or packets created according to predefined protocols that define their format. Data frames include headers (located at the beginning and containing addresses), footers (located at the end of the frames), and data fields that include the transmitted data bits (payload). Data frames may have a fixed or variable length according to the used protocol or network type.

A communications network transmits data from one end station (i.e., a computer, workstation, server etc.) to another using a hierarchy of protocol layers (i.e., layers that are hierarchically stacked). In the communication process, each layer in the source communicates with the corresponding layer in the destination in accordance with a protocol defining the rules of communication. This is actually achieved by transferring information down from one layer to another across the layer stack, transmitting across a communication medium, and then transferring information back up the successive protocol layers on the other end. To facilitate better understanding, however, one can visualize a protocol layer communicating with its counterparts at the same layer level.

The open system interconnection (OSI) model has seven layers that define the rules for transferring information between the stations. A physical layer (Layer 1) is responsible for the transmission of bit streams across a particular physical transmission medium. This layer involves a connection between two endpoints allowing electrical signals to be exchanged between them.

A data link layer (Layer 2) is responsible for moving information across a particular link by packaging raw bits into logically structured packets or frames. Layer 2 ensures good transmission and correct delivery by checking errors, re-transmitting as necessary, and attaching appropriate addresses to the data sent across a physical medium. If a destination computer does not send an acknowledgment of frame receipt, Layer 2 resends the frame. The contention access methods (e.g., CSMA/CD, and Token Passing) are regarded as Layer 2 activities. Layer 2 may be further divided into two sub-layers: Logical Link Control (LLC) and Media Access Control (MAC). The MAC sublayer defines procedures the stations must follow to share the link and controls access to the transmission link in an orderly manner. The MAC sublayer defines a hardware or data link address called a MAC address. The MAC address is unique for each station so that multiple stations can share the same medium and still uniquely identify each other. The LLC sublayer manages communications between devices over a single link of the communications network.

A network layer (Layer 3) is set up to route data from one network user to another. Layer 3 is responsible for establishing, maintaining, and terminating the network connection between two users and for transferring data along that connection. Layer 3 addresses, messages, and determines the route along the network from the source to the destination computer. Layer 3 manages traffic, such as switching, routing, and controlling the congestion of data transmissions.

A transport layer (Layer 4) is responsible for providing data transfer between two users at an agreed level of quality. When a connection is established, this layer is responsible for selecting a particular quality of service (QoS), for monitoring transmissions to ensure the selected QoS, and for notifying the users if the QoS deteriorates. Layer 4 also provides for error recognition and recovery, repackaging of long messages into smaller frames of information, and acknowledgments of receipt.

A session layer (Layer 5) focuses on providing services used to organize communication and synchronize the dialog that takes place between users and to manage the data exchange. The primary concern of Layer 5 is controlling when users can send and receive concurrently or alternately. A presentation layer (Layer 6) is responsible for the presentation of information in a way that is meaningful to network users. This may include character code transmission, data conversion, or data compression and expansion.

Layer 6 translates data from both Layer 5 and from Layer 7 into an intermediate format and provides data encryption and compression services. Layer 7 is an application layer that provides means for application processes to access the system interconnection facilities in order to exchange information. This includes services used to establish and terminate the connections between users and to monitor and manage the systems being interconnected, as well as the various resources they employ.

As data is passed down through the layers, each layer may or may not add protocol information to the data, for example, by encapsulating frames with a header or removing the header, depending on the direction in the protocol stack. The individual protocols define the format of the headers.

MAC address includes a source address and a destination address, which have a predefined relationship to a network station. Higher network layers provide a network address that has a logical relationship established by a network administrator according to a predetermined network addressing arrangement. The assigned network address conveys information that can be used by a router when routing frames through the internetwork. If the network address is hierarchical, a router may use a portion of the address to route the packet to a higher-level partition or domain in the internetwork. Some protocols are hierarchical others are not so hierarchical routing may or may not be available.

The global network may be subdivided into IP networks, which in turn may be subdivided into subnets. An IP address includes a network number (assigned by IANA), a subnet number (assigned by a network administrator), and a host that identifies an end station. The host number may be assigned by a network administrator, or may be assigned dynamically. This is a form of hierarchical addressing that is used by IP routing algorithms to perform hierarchical or prefix routing operations. Routing algorithms maintain information of all higher-level routing environments in routing tables for domains by recording their shortest unique address prefixes.

A station may support more than one network layer protocol. Such station has multiple network addresses and multiple protocol stacks that present the same MAC address on a port for the different protocols. Thus, a multi-protocol stack station connected to both an IP and an IPX network includes an IP network address and an IPX network address.

A communications network may include a number of network entities (or nodes), a number of interconnecting links and communication devices. A network node is, for example, a personal computer, a network printer, file server or the like. An interconnecting link is, for example, an Ethernet, Token-Ring or other type network link. Communication devices include routers, switches, bridges or their equivalents. As computer networks have grown in size, network management systems that facilitate the management of network entities, communication links and communication devices have become necessary tools for a network administrator.

A bridge or a switch is a Layer 2 entity that is typically a computer with a plurality of ports for establishing connections to other entities. The bridging function includes receiving data from a port and transferring that data to other ports for receipt by other entities. A bridge moves data frames from one port to another using the end-station MAC address information contained in the switched frames. Switches interconnect the communication media to form small domains of stations, such as a subnetwork. Subnetworks or subnets provide an organizational overlay to an internetwork that facilitates transmission of data between the end stations, particularly for broadcast transmissions. The subnet functions to limit the proliferation of broadcast frames to stations within a broadcast domain.

A router is an intermediate station that interconnects domains or subnets by providing path from a node on a first network to a node on a second network. There are single protocol or multi-protocol routers, central or peripheral routers, and LAN or WAN routers. A peripheral router connects a network to a larger internetwork, and thus may be limited to a single protocol. A central router may be connected to a different board in a server or a hub and thus usually has a multi-protocol capability.

A router provides the path by first determining a route and then providing an initial connection for the path. A router executes network routing software that depends on the used protocol. A router can work with different data-link layer protocols and thus can connect networks using different architectures, for example, Ethernet to Token Ring to FDDI. Furthermore, there are routers of several levels, wherein, for example, a subnetwork router can communicate with a network router. Organizing a communications network into levels simplifies the routing tasks since a router needs to find only the level it must deal with. The use of different network levels is shown in FIG. 1.

In general, a global communications network connects devices separated by hundreds of kilometers. A LAN covers a limited area of maximum several kilometers in radius connecting devices in the same building or in a group of buildings. LANs usually include bridges or switches connecting several end-stations and a server. In a LAN, a bridge or a switch broadcasts traffic to all stations. Until a few years ago, a LAN was user-owned (did not run over leased lines) with gateways to public or other private networks. When a user moved or changed to an end-station at another location on the network, a network administrator had to rewire and reconfigure the user's station. This has changed with the introduction of virtual LANs.

A virtual LAN (VLAN) is a logical Layer 2 broadcast domain, which enables a logical segmentation of the network without changing the physical connections. A VLAN enabled switch segments the connected stations into logically defined groups. Broadcast traffic from a server or an end-stations in a particular VLAN is replicated only on those ports connected to end-stations belonging to that VLAN. The broadcast traffic is blocked from ports with no end-points belonging to that VLAN, creating a similar type of broadcast containment that routers provide. VLANs may also be defined between different domains connected by a router. In this case, the router passes network traffic from one domain to the other (as done without defining a VLAN), and passes network traffic from one VLAN to the other. The router also passes network traffic between VLANs that are in the same domain because VLANs do not normally share user information. The router is configured as a member of all VLANs.

Virtual Private Networks (VPNs) have been designed to interconnect end-stations that are geographically dispersed. For example, owners of large communications networks can provide centralized management services to small and medium sized businesses. The provider can configure VPNs that interconnect various customer sites in geographically separate locations. These VPNs offer privacy and cost efficiency through sharing of network infrastructure. Various VPNs have been proposed with various degrees of security, privacy, scalability, ease of deployment and manageability.

A global communications network may use a different levels different routing and connection management protocols such as International Standards Organization (ISO) Open Systems Interface (OSI) Intermediate Systems to Intermediate Systems (IS-IS), and Internet open Shortest Path First (OSPF) protocols are used for connectionless routing of data frames. Asynchronous Transfer Mode (ATM) Forum Private Network-Network-Interface (PNNI) protocol is used for connection oriented multi-media services. The routing protocols identify a network node using a global address of a Route Server Element (RSE). The RSEs generate routing that identifies optimal routes for communication throughout the network. The RSE is responsible for administration of the algorithms that enable a node to keep its view of the network topology and performance metric current, referred to as Routing Information Exchange (RIE). Thus an RSE usually acts as a central element for the routing of traffic through the node.

In general, the use of WANs, LANS, VPNs, and VLANs has increased the number and complexity of communications networks. These networks continuously evolve and change due to growth and introduction of new interconnections, topologies, protocols, or applications. Furthermore, most networks have redundant communication paths to prevent portions of the network from being isolated due to link failures. Also, multiple paths can be used simultaneously to load-balance data between the paths. However, redundant paths can also introduce problems such as formation of loops. Furthermore, network performance can degrade due to improper network configurations, inefficient or incorrect routing, redundant network traffic or other problems. Network hardware and software systems may also contain design flaws that affect network performance or limit access by users to certain of the resources on the network. These factors make network management complex and difficult.

A network management process controls and optimizes the efficiency and productivity of a communications network. A network management station manages the network entities (e.g., routers bridges switches, servers, storage devices, computers, printers) using a network management protocol such as a Simple Network Management Protocol (SNMP), Internet Control Message Protocol (ICMP), or another network management protocol known in the art. Using a network management protocol, the network management station can deliver information or receive information by actively polling the network entities or by receiving unsolicited information from the network entities. Using SNMP, a network management station can executes a set, get, or get-next functions to set and retrieve information from a network entity. This information may be stored within the polled network entity as Management Information Base (MIB). The network management station can receive unsolicited information from a network entity in the form of an SNMP trap. Network entities may send SNMP traps to the network management station when a problem in the network or network entity occurs.

A network management station may be implemented using any general purpose computer system, which is programmable using a high-level computer programming language or using specially programmed, special purpose hardware. The hardware includes a processor executing an operating system providing a platform for computer programs that run scheduling, debugging, input-output control, accounting compilation, storage assignment, data management, memory management, and communication control and other services. The application programs are written in high level programming languages.

A network management station can include a network manager unit, a network communication interface, a data acquisition unit, a data correlation unit, and a graphical user interface. The data correlation unit interprets data received through the data acquisition unit and presents the interpreted data to a user on the graphical user interface. The network communication interface may include transport protocols and LAN drivers used to communicate information to the communications network. The transport protocols may be IPX, TCP/IP or other well-known transport protocols. The LAN drivers may include software required to transmit data on a communications network through the network interface. The LAN drivers are generally provided by the manufacturer of the network interface for a general purpose computer for the purpose of communicating through the network interface. The network manager unit may be an SNMP network manager/agent implementing SNMP functions, or another type of network manager unit performing associated management functions. The network manager unit utilizes the network communication interface to transfer requests to network entities over a communications network.

A network management station may use a network management agent residing on a network entity. The network management agent may be a software process running on a processor or may be special purpose hardware. The network management agent may be an SNMP agent (or ICMP agent), which may include a data collection unit, a network manager unit, and a network communication interface for communication as described above. For example, this communication may use network management functions such as SNMP functions. Alternatively, a network management agent, residing on a network entity, may include a data correlation unit, a data collection unit, a network manager unit and a network communication interface for communication.

There are prior art network management systems (NMS) that detect a fault and represent the fault status in the form of a single Boolean attribute of the model representing a faulty network element in a NMS database. Here, the fault status represents the NMS's ability to contact a network element using common management protocols such as a SNMP protocol or an ICMP protocol.

There are also prior art NMS that include objects, called inference handlers. Inference handlers perform work based on changes to a managed entity's attribute. In an NMS, the inference handler provides the intelligence behind the objects. An inference handler can perform different functions such as fault isolation or suppression, but these are frequently based on the NMS's ability to contact the network element, which is used as the fault status attribute. The NMS can then suppress the fault status of a network element depending on the status of other neighboring network elements. Frequently, however, loss of contact information in an NMS database does not sufficiently represent various problems a network element can experience as a result of a fault in a communications network.

In general, there is a need for a fault management and diagnosis process that can provide a generic, open framework applicable to any system.

SUMMARY OF THE INVENTION

The present invention is a system, a method and a product (that can be stored in a computer-readable storage medium) for diagnosing or analyzing faults of various types (including a complete or partial failure).

According to one aspect, a method or system for analyzing a fault includes a fault object factory constructed and arranged to receive fault data and create a fault object; and a fault diagnosis engine constructed and arranged to perform root cause analysis of the fault object.

Preferably, the method or system may further include one of more of the following: a fault detector constructed and arranged to detect a fault in a monitored entity; a fault repository constructed and arranged to store and access the fault object; and a fault handler constructed and arranged to be triggered by the fault diagnosis engine to analyze the fault object. The fault handler includes a fault handler tester and a fault handler diagnoser.

According to another aspect, a method or system for analyzing a fault including means for receiving fault data, means for creating a fault object; and means for performing a root cause analysis on the object to determine a root cause.

Preferably, the method or system may further include one of more of the following: Means for creating a fault object includes a fault object factory using fault data or a detector remotely located from the system. Means for performing the root cause analysis includes means for invoking specific fault handlers. Means for employing fault handlers includes employing a diagnoser fault handler or a tester fault handler. Means for employing fault handler includes obtaining an ordered list of fault handlers for a specified transition state of the fault object. Means for obtaining the ordered list includes employing a diagnoser fault handler registered for the type of the analyzed object. The diagnoser fault handler transitions fault object between processing states.

The present system and method provide a generic, open framework that implements a fault diagnosis engine for controlling the entire process, a fault object factory for creating fault object, a fault repository for receiving and storing fault objects, and fault handlers used for performing fault correlation and root cause analysis.

The fault management and diagnosis system may be used for diagnosing faults in any system or device (for example, a mechanical or electronic device, a communications network, a material transfer network, a shipping network). The fault diagnosis engine receives detected fault information from multiple sources, controls the fault management, and executes a root cause analysis. The fault diagnosis engine also provides a mechanism for fault correlation and fault impact assessment. In communications networks, the impact assessment is applicable to both disruptions in services (or applications that depend on the network infrastructure) and to reduction of network performance due to the fault.

As mentioned above, the fault management and diagnosis system uses a fault object factory that creates fault records, called fault objects that store some or all information pertaining to a single network problem. Each fault has a processing state, which guides the fault through its life cycle. The fault management and diagnosis system uses fault handlers that are specifically designed to be triggered upon changes in the state of a given type of fault. The fault handlers perform various aspects of the automated fault management process described below.

Advantageously, the present system creates a fault hierarchy or tree as a result of diagnosis of a single detected problem in a managed system and this facilitates root cause isolation. The fault tree facilitates a log of the entire diagnosis process for the analyzed fault, and inferred impact calculation based on the association of faults in the tree. The fault tree also facilitates fault resolution and re-evaluation because the conditions tested during the original diagnosis of a problem are recorded in the tree, and the ability to control the processing of faults based on fault state transition.

BRIEF DESCRIPTION OF THE DRAWINGS

FIG. 1 shows diagrammatically several network management modules connectable to a communications network.

FIGS. 6, 6A, 6B, and 6C are block diagrams of a fault tree according to one preferred embodiment.

FIGS. 7, 7A and 7B are block diagrams of a fault tree according to another preferred embodiment.

FIGS. 8, 8A, 8B, 8C and 8D are block diagrams of a fault tree according to yet another preferred embodiment.

DESCRIPTION OF PREFERRED EMBODIMENTS

Figure 2:
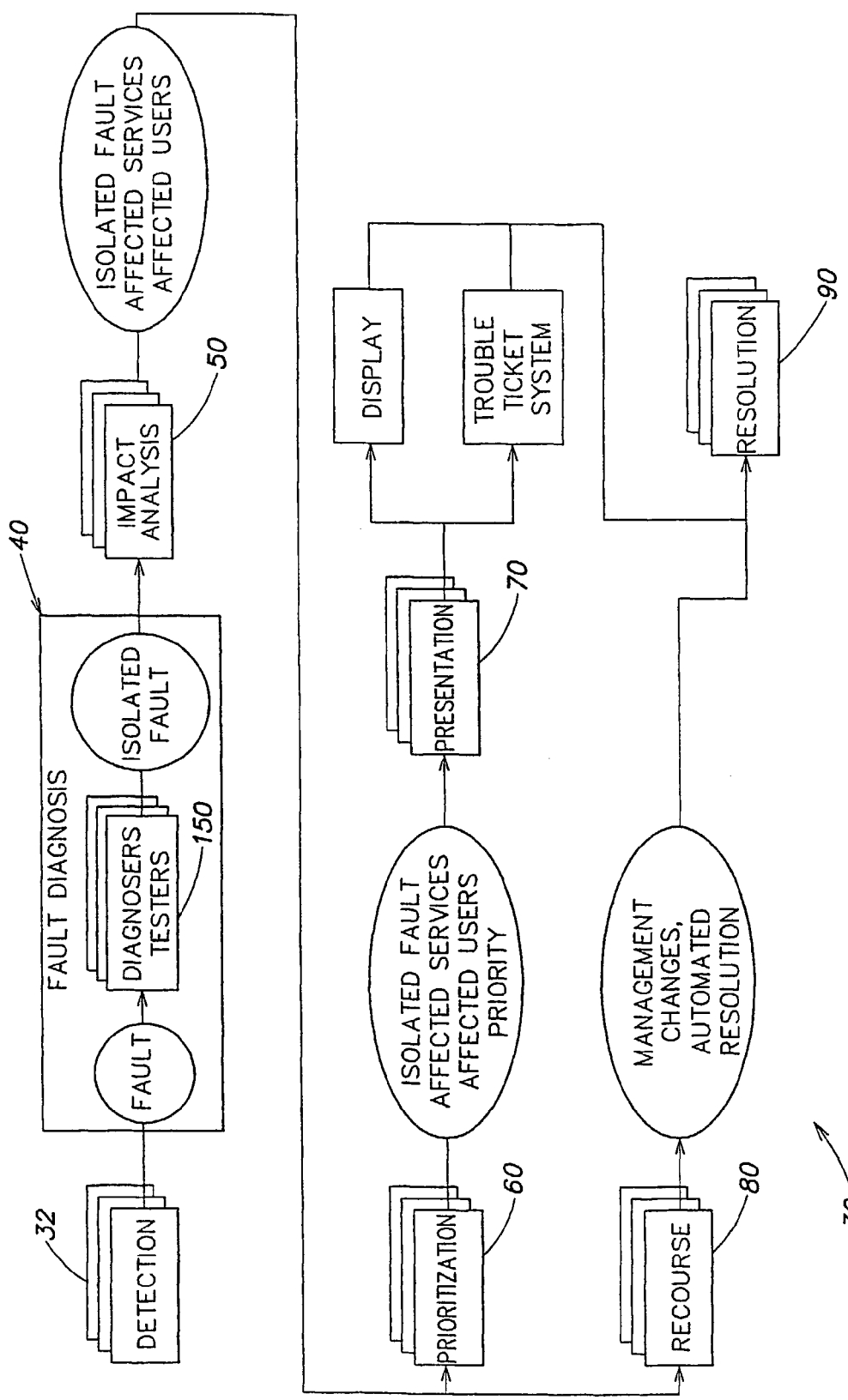
FIGS. 2 and 2A are block diagrams of a fault management and diagnosis process.

FIG. 1 shows diagrammatically a network management system 10 including a fault diagnosis system 12, a topology mapper 14, an impact analyzer 16 and a help desk system 18. The network management system communicates with a communications network 20 (or application service). The network includes a set of interconnected network elements such as routers, bridges, switches, and repeaters. These network elements provide transportation of data between end stations. Furthermore, there are computers known as servers that provide services such as e-mail, accounting software, sales tools, etc. Typically, data is transmitted electronically or optically, and network elements can forward data in packets, frames or cells to the intended destination. Servers include network adapters and/or software that interpret the electronic or optical data packet into the data elements and pass these elements to the appropriate application being hosted.

The network management system 10 includes a commercially available processor (for example, Pentium microprocessor manufactured by Intel Corporation) executing an operating system providing an operating environment for a network management program. The processor and the operating system provide a computer platform for which application programs are written in higher level programming languages. The computer (or application host) interfaces with permanent data storage, such as a magnetic or optical disk drive, a disk array, non-volatile RAM disk, or a storage area network, which maintain data files such as user configurations and policies. In general, the network management program may be configured as a generic software application residing in any commercially available computing platform.

Preferably, fault diagnosis system 12, topology mapper 14, and help desk system 18 are software applications written in Java and running on any computer with a Java Runtime Environment (JRE). For example, a Dell laptop computer with an Intel Pentium processor running the Windows 2000 operating system, or a Sun Ultra 60 computer running Solaris v. 2.7. Alternately, fault diagnosis system 12, topology mapper 14, and help desk system 18 are developed in any object oriented or structured programming language, and compiled for execution on any one or many computer platforms, or could be implemented on a neural network computing device.

The computer has a network adaptor that provides communication (preferably, but not necessarily, IP) to the users on the network. The fault diagnosis engine application may share a host with help desk system 18, and/or the topology mapper, or each can run on a separate host, in which case they communicate using a network adaptor. Topology mapper 14 determines the network topology and creates a model. The permanent data storage holds data files that describe the current network topology, and configuration files that control the performance of topology mapper 14. A user is an end station, interfaced to access the network or services, used by a person who is using the network, or is using services provided by the network.

The network management system 10 performs a fault management process 30 shown in FIG. 2. The entire process is part of a phased, componentized, but interconnected method, wherein all aspects of fault management are performed. The fault management process of FIG. 2 includes the following seven phases: fault detection 32, diagnosis 40, impact analysis 50, prioritization 60 presentation 70, recourse 80, and resolution 90.

Fault detection process 32 (performed by fault detectors 130 shown in FIG. 3) is the most basic part of the fault management system. Fault detectors 130 detect raw fault data. Fault detectors 130 receive information by SNMP polling, SNMP trap handling, performance monitoring, historical trend analysis, device configuration monitoring, application and system-level management tools, and help desk trouble tickets. Fault detection process 32 can also add information to the raw fault data enabling improved diagnosis of the fault. The fault data are assembled into fault objects.

Fault diagnosis 40 occurs after a "detected" fault is entered into a fault detection and management system 100, which is a generic system for diagnosing a fault in any a mechanical, electrical or other system. A fault detection and management system 100 (FIG. 3), processes and correlates detected faults with other faults to determine their relationship. Fault detection system 100 finds one or more "root cause" faults and isolates these faults. Furthermore, the system can optionally suppress other symptomatic faults that were "caused" by the root cause fault. Fault diagnosis 40 can be performed in a single step or can involve many techniques such as examining device neighbor knowledge, tracing the route of management data, examining route tables and ACLs, etc.

Figure 3:
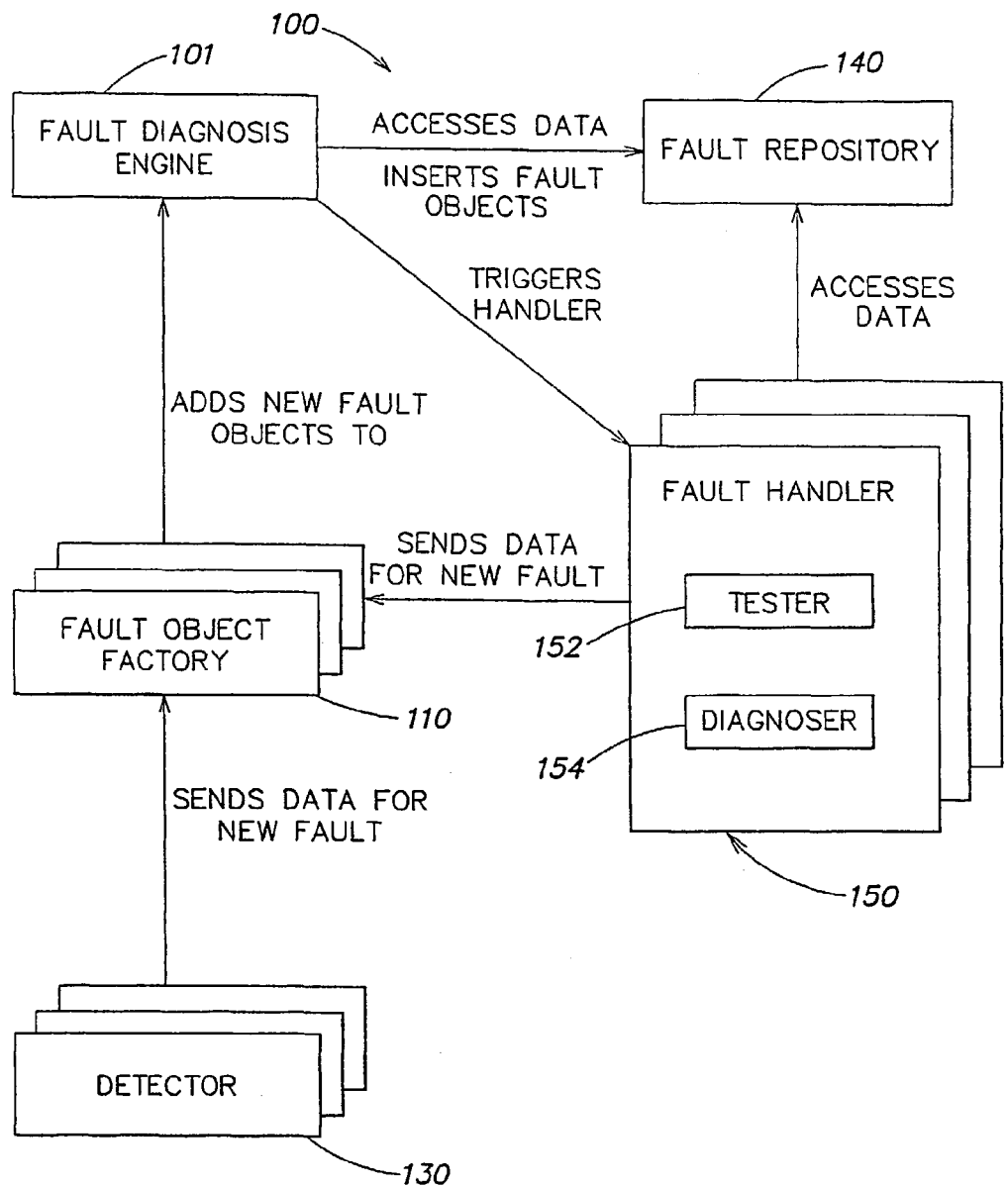
FIG. 3 is a block diagram of modules employed in a fault management and diagnosis system.

Fault impact analysis 50 determines the "scope" of the analyzed fault. After receiving a root cause fault determined, by fault diagnosis 40, impact analysis 50 determines the consequences of this fault. This determination includes analyzing the network services affected by the fault, the users affected by the fault, and any other ramifications the fault has on network 20, or the application being managed. Furthermore, impact analysis 50 may involve analyzing various logical layers that exist in a communication network and correlating a fault with its possible consequences at each layer. Impact analysis 50 may use a fault causality tree located in a fault repository 140 (FIG. 3). The interpretation schemes include analyzing how a network fault affects services like web servers or e-mail, examining how a misconfigured router running OSPF affects the users in each area, etc.

The network management system may also perform fault prioritization 60. After a fault has been diagnosed and its impact analyzed, the fault may be prioritized. Fault prioritization 60 assigns a priority/severity to each fault object and this is used to determine the proper presentation of the fault to a user. Fault prioritization process 60 may include multiple methods based on the type and scope of the fault such as examination of service level agreements and how the fault violates them, mission critical device analysis, and fault scope.

The network management system may also perform fault presentation 70. Fault presentation 70 provides the mechanism by which the system alerts a user that a fault has occurred. Fault presentation process 70 presents all information about the fault in a user friendly manner. Fault presentation 70 may include steps and processes the systems used to diagnose the fault, thus allowing a user to verify the diagnosis and "trust" the system to accurately diagnose faults. Fault presentation 70 may also include a network monitoring alarm system.

The network management system may also include fault recourse 80. Fault recourse 80 provides a way in which a user can change the network management based on a given fault. For example, fault recourse 80 may involve reducing or stopping polling of devices downstream from a fault, reconfiguring connectivity modeling, script invocation to fix a misconfigured static route, or configuring user groups for a different email server.

The network management system may also include fault resolution 90. After presenting a fault to a user and fixing the problem, problem resolution 90 records the process for future fault detection and diagnosis. Fault resolution 90 can automatically trigger for any single resolved fault a re-evaluation of associated faults in the system. This re-evaluation proactively assesses the full scope of a resolved fault. If an associated fault is still not resolved, diagnosis can be re-started to determine the cause. This process is facilitated by the use of the fault causality tree created as a result of fault diagnosis process 40.

Figure 2A:
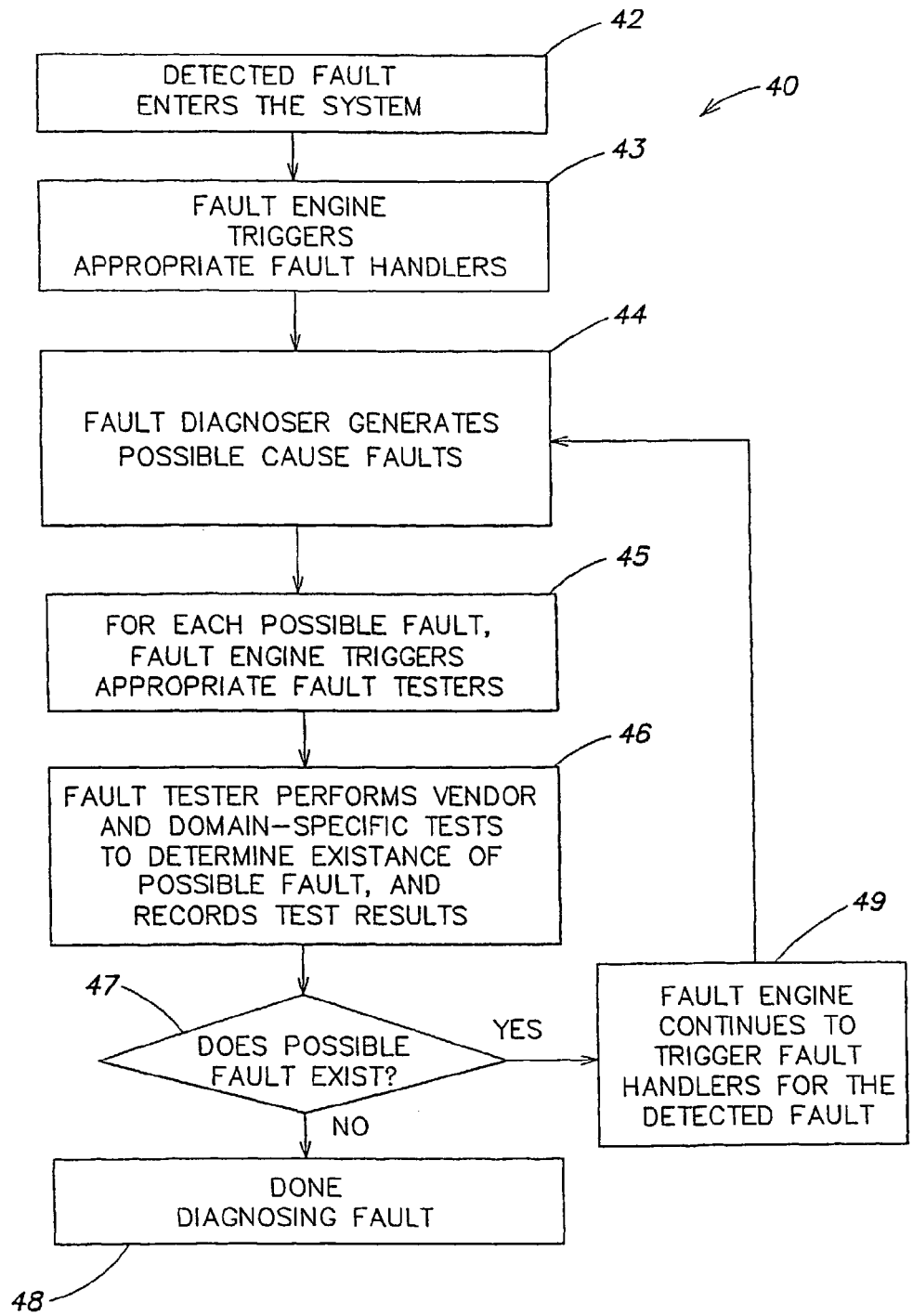

FIG. 2A shows diagrammatically in detail fault diagnosis process 40. A detected fault enters the fault detection and management system and a fault object is created (step 42). The fault diagnosis engine (101 in FIG. 3) triggers appropriate fault handlers (step 43). A diagnoser fault handler generates possible faults that may be causes of the previously entered fault (step 44). For each generated, possible fault, fault diagnosis engine 101 triggers appropriate tester fault handlers (step 45). Each tester fault handler performs vendor-specific and domain-specific tests to determine the existence of one or several possible faults. Next, the tester fault handler records test results (step 46). If possible additional faults exist, the fault diagnosis engine continues to trigger tester fault handlers and diagnoser fault handlers (step 49). If there are no other possible faults, the fault diagnosis engine has isolated the fault and the system proceeds to impact analysis 50.

FIG. 3 illustrates diagrammatically a fault detection and management system 100. One embodiment of fault detection and management system 100 is fault diagnosis system 12 (FIG. 1). Fault detection and management system 100 includes five main parts: a fault diagnosis engine 101, a fault object factory 110, fault detectors 130, a fault repository 140, and fault handlers 150. Fault detection and management system 100 has the ability to receive detected fault information from multiple sources, control the management of the faults, and produce a root cause analysis. Furthermore, the system also provides a mechanism for performing fault correlation and impact analysis. The impact assessment is not limited to the impact of the communications network, but may include disruptions in services or applications that depend on the network infrastructure.

Figure 3C:
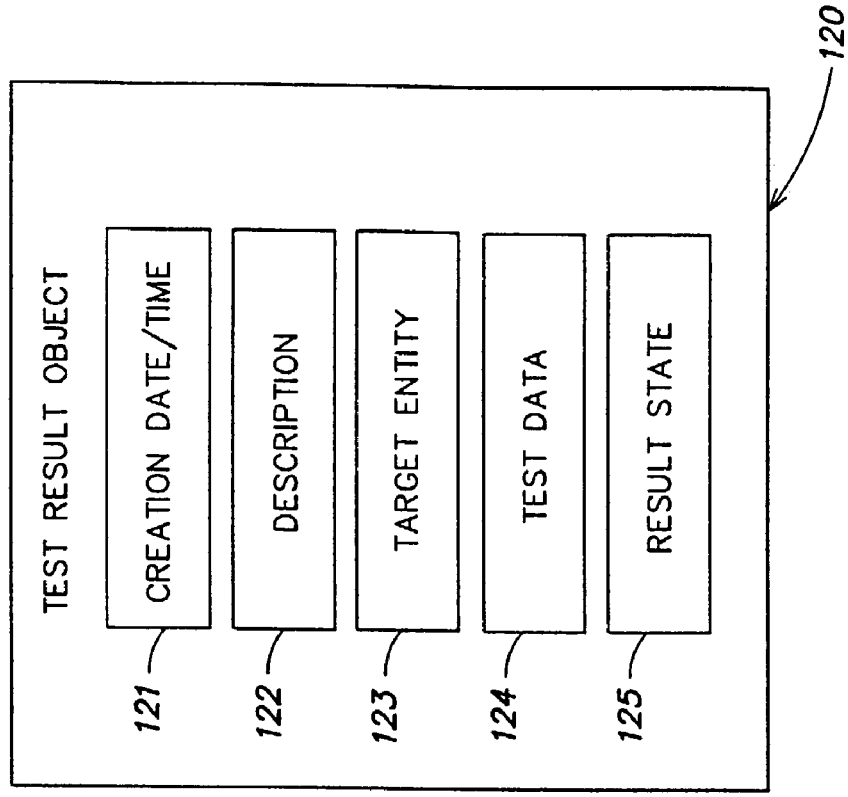
FIGS. 3A and 3C are block diagrams of objects employed in the fault management and diagnosis system of FIG. 3.
Figure 3A:
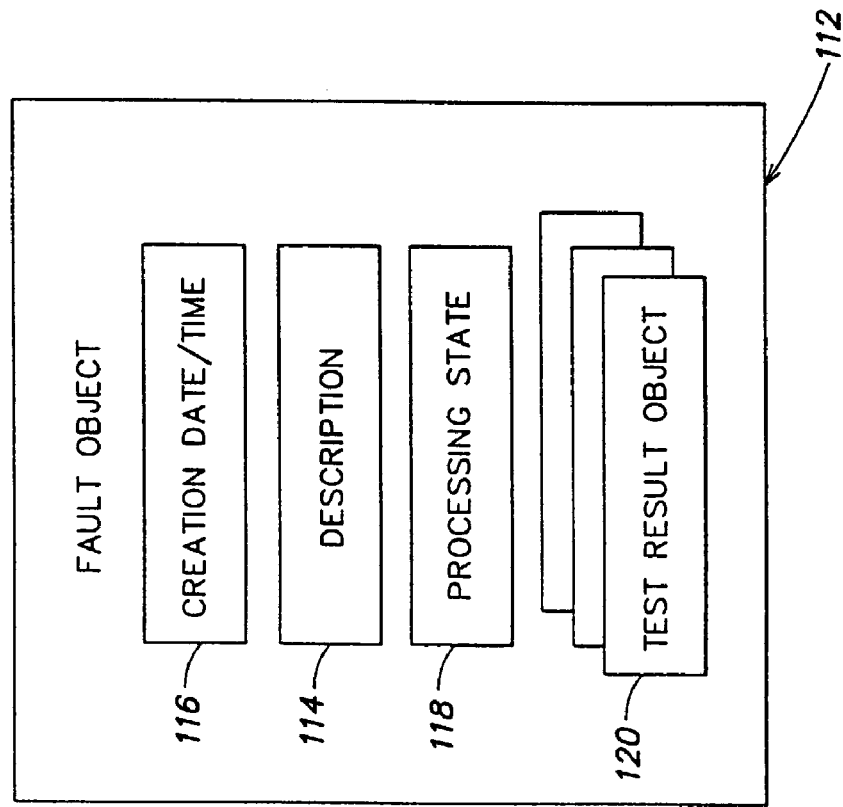

Fault object factory 110 receives data from fault detectors 130 and creates fault objects 112 shown in FIG. 3A. Each fault object 112 is associated with a fault type and there may be many fault types. Furthermore, each instance is a separate occurrence of a problem, potential problem, or condition of a communication network or an element located in the communication network (such as a misconfiguration, a degradation of service, physical failure or other).

Referring to FIG. 3A, the entire architecture of the fault detection and management system based on fault objects 112, which are records representing a detected problem, a potential problem, or a condition. Fault object 112 includes information about a detected fault, that is, includes a description of the problem or condition stored in field 114, time and date of the reported problem 116, a fault processing state 118, and one or more test result objects 120. The fault structure includes a context that is a mechanism for sharing varying amounts of data related to the fault; these amounts may exist between each instantiation of a type of fault.

Referring to FIG. 3, fault detector 130 detects a problem or potential problem on an entity in a managed system. Fault detector 130 provides a record of the condition to fault object factory 110, which generates fault object 112. Fault detector 130 can monitor an entity or receive unsolicited notification from an entity when a problem occurs, according to different methods known in the art. Fault detector 130 may perform a test and may provide to fault object factory 110 data with the results of the performed tests. Fault detector 130 may share a host with fault diagnosis engine 101, or may reside externally as an agent.

Figure 3B:
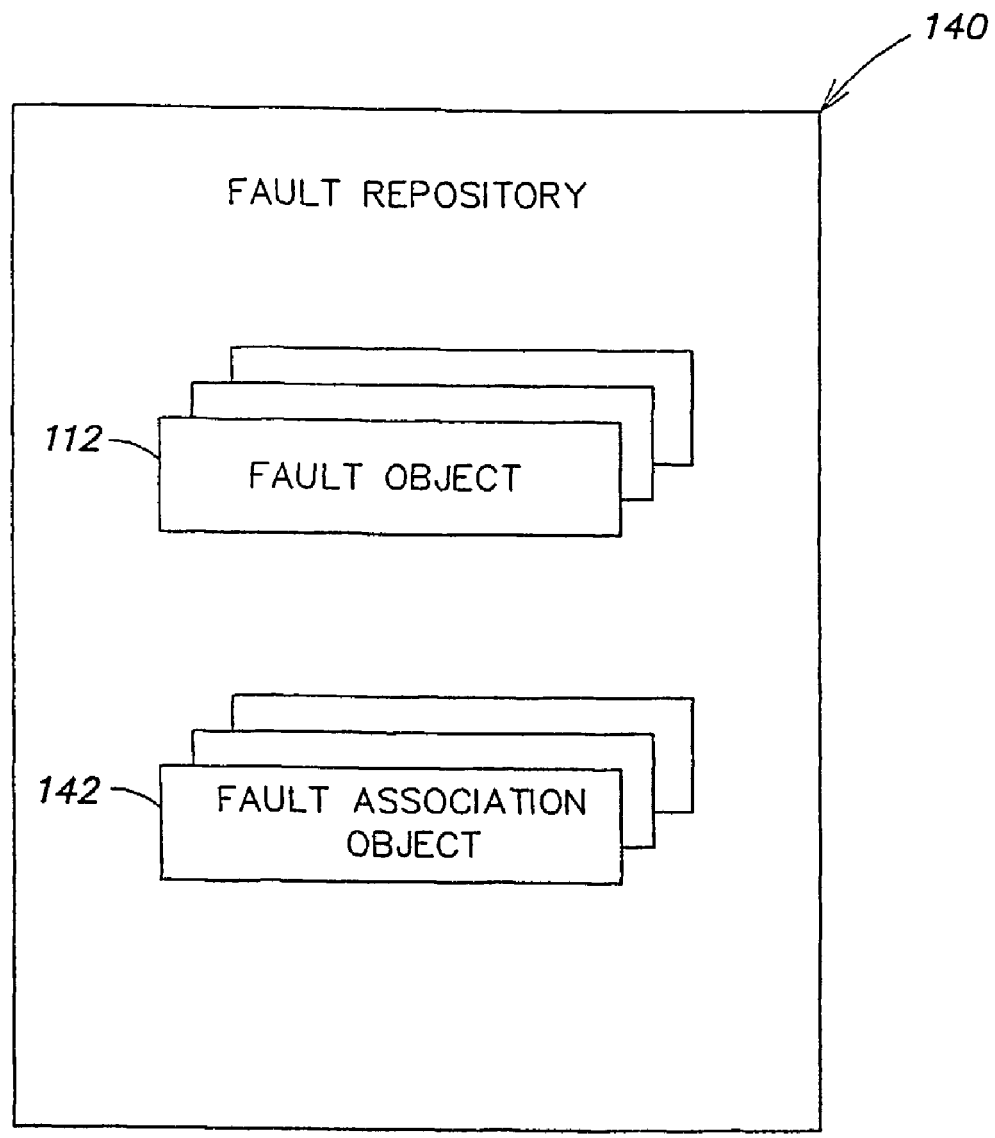
FIG. 3B is a block diagram of a fault repository module employed in the fault management and diagnosis system of FIG. 3.

Referring to FIG. 3B, fault repository 140 is the component used by a fault detection and management system 100 to store and access fault information. fault repository 140 stores every fault object 112 present in the system. Each component of the system (detection, diagnosis, etc.) can enter new fault objects into fault repository 140 and access any fault object 112. Preferably, fault repository 140 includes a table structure with services capable of searching and locating existing faults.

Fault repository 140 also includes fault associations 142, which provides a mechanism for relating faults to one another. Specifically, each defined fault association relates two fault objects. One fault object is on the left side of the association, and the other fault object is on the right side as shown for fault trees below. The semantics of an association are defined by the type of the association. New fault association types can be defined and added to the system, preferably using Interface Description Language (IDL) definitions of an interface for a service that uses the Common Object Request Broker Architecture (CORBA) transport protocol.

Figure 5:
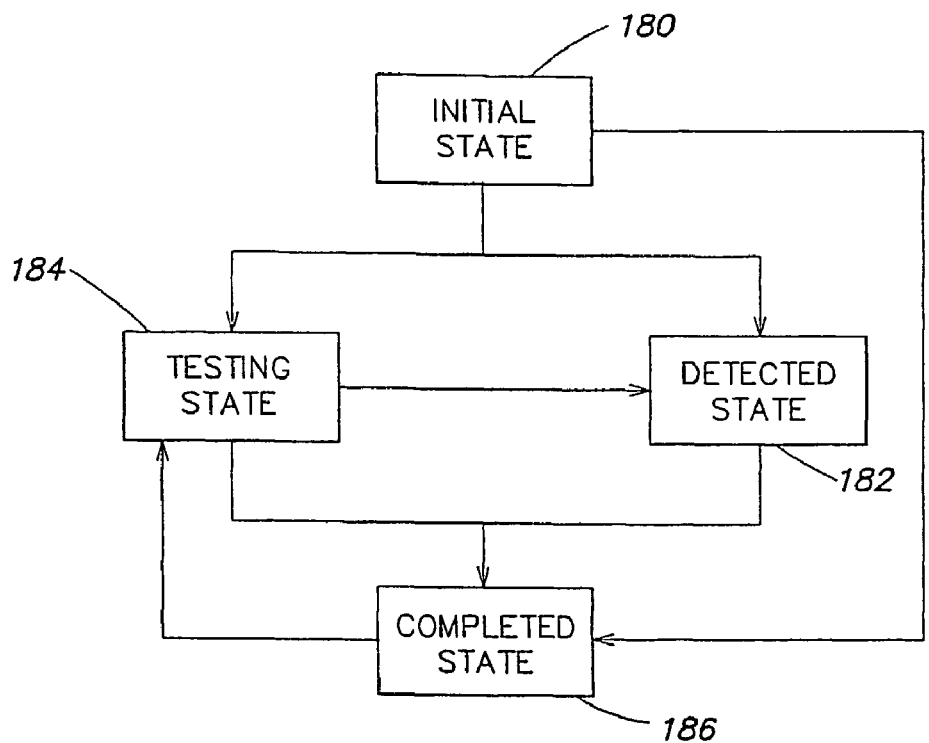
FIGS. 5 and 5A are block diagrams depicting processing states of a fault during fault analysis.

Referring again to FIG. 3, each fault handler 150 performs a designated type of work as a result of a fault object entering a certain processing state (shown in FIG. 5). Fault handlers 150 may exist internal to the system, or reside externally in a separate process. Fault handlers 150 are registered for a particular fault type and state and, as part of the registration process, each fault handler 150 has an integer priority value. Then, fault handlers 150 are sorted by their priority values so that a fault handler with the lowest priority value is triggered first and subsequent handlers are triggered in sequence, as described below. One type of fault handler 150 can test a fault object and create a test result record. Furthermore, fault handler 150 may create additional types of fault objects, create associations between fault objects, correlate fault objects that indicate a similar problem, or perform impact analysis on a fault object to determine the scope of a problem. A tester fault handler 152 performs a selected test on a fault. A diagnoser fault handler 154 creates additional types of fault objects.

Fault diagnosis engine 101 is the central component of fault detection and management system 100 since it drives the management and diagnosis of faults. Fault diagnosis engine 101 provides a generic mechanism for fault handlers 150 to register for changes in the processing state of faults of a given fault type. Fault diagnosis engine 101 may employ any mechanism to specify registrations. The preferred implementation of fault diagnosis engine 101 uses XML (Extensible Markup Language) technology.

Figure 4:
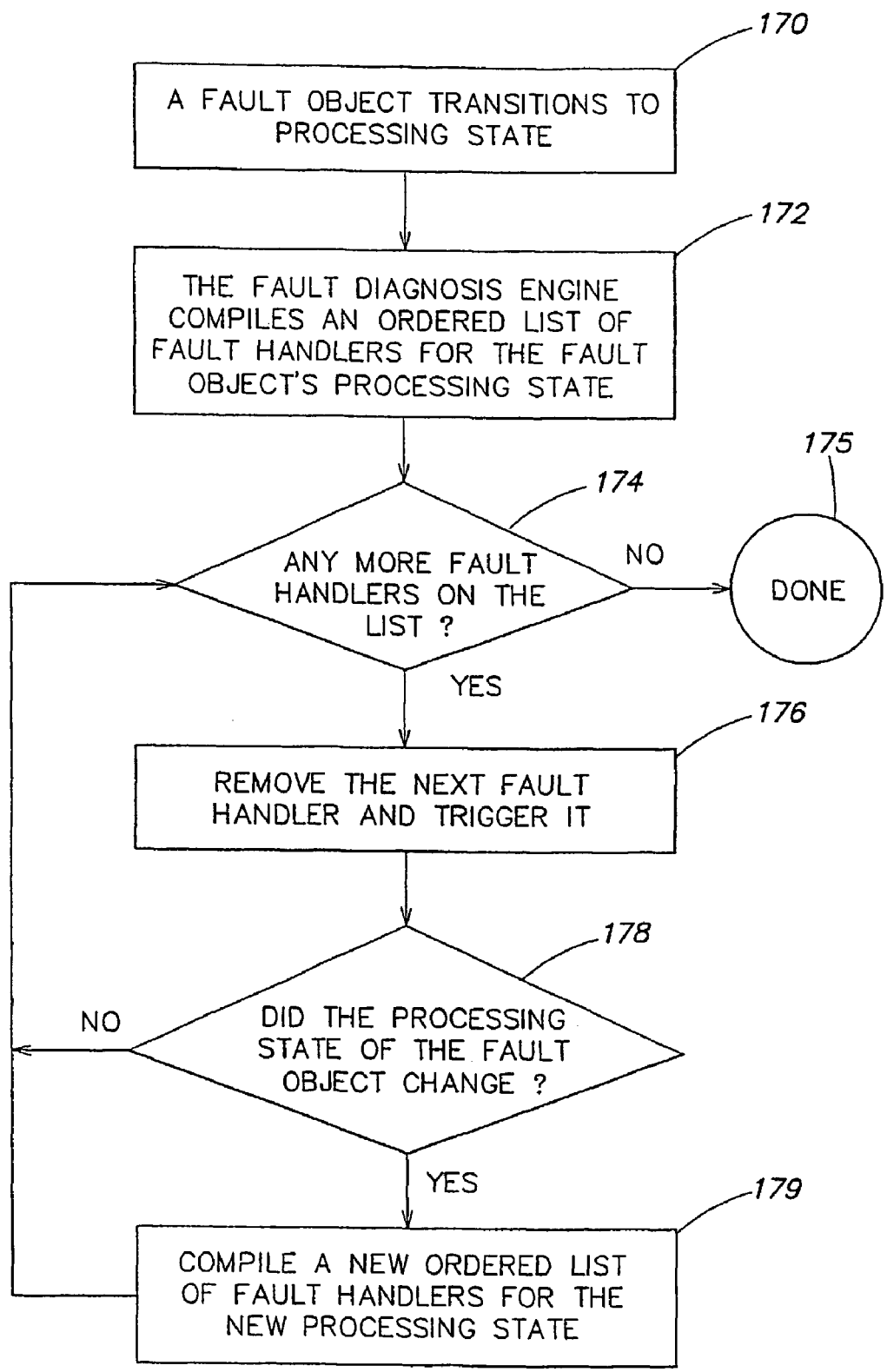
FIG. 4 is a flow diagram that illustrates a triggering mechanism for fault handlers by a fault diagnosis engine shown in FIG. 3.

Referring to FIG. 4, when a fault transitions to a state for which a handler has registered, the engine triggers the handler to perform its work. Fault diagnosis engine 101 can trigger one of fault handlers 150 arbitrarily or may use some ordering mechanism. Preferably, fault diagnosis engine 101 uses a priority mechanism to order the triggering of fault handlers that are sorted by their priority value (by triggering first a fault handler with the lowest value).

Figure 5A:
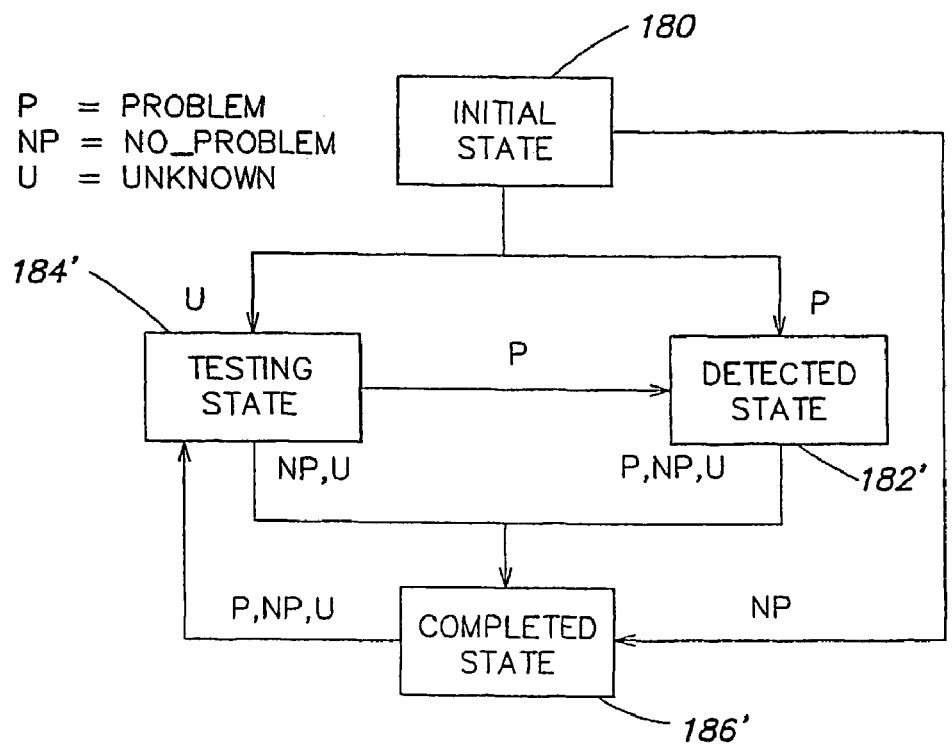

Fault detection and management system 100 uses fault processing states for analyzing faults. A fault's processing state represents its status in the fault management process and provides a mechanism to control the management of the fault. A fault can have a large number of possible states, and a fault can transition from state to state using different ways, as shown in FIGS. 5 and 5A. Preferably, the system utilizes a fault type hierarchy in which generic base fault types are defined and from which, new more specific fault types can be derived. Each fault, which exists in the system, is of some pre-defined fault type.

Referring to FIG. 3C, a test result object 120 includes a record of test results that were performed to determine the existence of the problem or condition for which the fault was created. Test result object 120 includes a textual description of the test (field 122), data identifying from the target of the fault (field 123), test data (field 124), any thresholds and parameters used in determining the test result (field 125). Test result record 125 also contains a state representing the status of the test.

While performing its work on a fault object, a fault handler may cause the processing state of the fault to be changed. In this case, no other handlers for the current state are triggered. Fault diagnosis engine 101 obtains the handlers for the new state and resumes triggering with the new handlers when the current handler completes its work.

FIG. 4 illustrates the triggering mechanism using a flow diagram. Fault diagnosis engine 101 provides a triggering mechanism and controls and manages the diagnosis process.

Referring to FIG. 5, fault diagnosis engine 101 utilizes processing states of a fault to control the flow of diagnosis for that fault. As described above, fault handlers 150 are triggered for a fault based on the current processing state. The transition diagram of FIG. 5 defines the following processing states: An initial state 180 begins the life-cycle of a fault object. A detected state 182 indicates that an external fault detector 130 or an internal handler 150 positively determined the condition (that the fault represents) as a problem. A testing state 184 indicates the fault is unverified; that is, the condition that the fault represents requires testing to determine if it is a problem. A completed state 184 indicates that fault diagnosis has completed for the fault.

Fault diagnosis engine 101 may allow fault handlers 150 to directly transition a fault between states, wherein preferably the processing state is hidden from fault handlers 150. The engine transitions a fault's processing state based on the state of the current result of the fault as provided by the handlers. These are the following three test result states (shown in FIG. 5A): PROBLEM indicates a test has identified the fault to be a problem; NO_PROBLEM indicates a test has verified the condition that the fault represents does not or no longer exists; and UNKNOWN indicates a test could not be completed for some reason or the condition that the fault represents requires verification.

FIG. 5A illustrates transition of the processing states (shown in FIG. 5) based on test results of an analyzed fault. For example, fault diagnosis engine 101 triggers tester fault handler 152 (FIG. 3) for testing state 184 and fault handler diagnoser 154 for detected state 182. Furthermore, fault handler diagnoser 154 may also be triggered for testing state 184 if there are no tester fault handlers that can perform a direct test. There may also be fault handlers for completed state 184, which would not perform diagnosis, but would perform other tasks such as correlating faults that share a common root cause (described below) or notifying a presentation system to display the diagnosis results when performing presentation process 70.

Fault diagnosis engine 101 may employ further rules that govern the triggering of fault handlers when there are multiple handlers (or types of handlers) for a particular processing state. If there are multiple types of handlers, the engine may impose an ordering such that all handlers of one type are triggered before any handlers of another type. Furthermore, if a handler provides a concrete result, as defined by the various result states, the engine may suppress remaining handlers of that type from being triggered and/or may suppress handlers of other types.

According to the preferred embodiment, since there may be both tester fault handlers 152 and diagnoser fault handlers 154 registered for testing state 184, fault diagnosis engine 101 imposes a rule that all tester fault handlers are triggered before any diagnoser fault handler. This is because a tester fault handler can directly determine the existence or nonexistence of a problem, but a diagnoser fault handler cannot. In addition, if a tester fault handler or diagnoser fault handler provides a concrete result, then fault diagnosis engine 101 suppresses remaining handlers for the current processing state. A concrete result is one whose state is either PROBLEM or NO_PROBLEM. A result state of UNKNOWN is not concrete, that is a result could not be positively determined, as shown in FIG. 5A.

Fault detection and management system 100 utilizes a decomposition approach in the diagnosis of a fault to determine the root cause. Fault detector 130 enters a problem or potential problem into fault object factory 110, which creates a fault object treated as a symptom fault. The symptomatic fault is decomposed into one or more constituent faults that further refine the symptom as shown in FIG. 6. Each constituent fault represents a possible suspect that may be causing the symptom. For each constituent fault, tests may be performed to determine the existence of a problem or the fault may be decomposed into further suspects. The process continues until all faults have been completely decomposed and there are no more suspects.

The end result of this process is a hierarchy of faults in the form of a tree with the original symptomatic fault at the root as shown in FIG. 6. The fault tree includes a root fault level, one or several intermediate fault levels, and a leaf fault level. Each fault in the tree, except the root, has at least one parent fault from which it was decomposed. Each fault also has zero or more child faults that were spawned from it. A child fault represents a possible cause of its parent. A fault that has children but is not the root is termed an intermediate fault. A fault that has no children, that is one that could not be further decomposed, is termed a leaf fault. A leaf fault that indicates a problem is a probable cause of the root symptom. There may be more than one root cause.

Referring to FIG. 6, fault A is the original root symptom. Fault A is decomposed into faults B and C, fault B is decomposed into faults D and E, and fault C is decomposed into faults F and G. Faults B and C are intermediate faults because they have children but are not the root. Faults D, E, F, and G are all leaf faults.

Fault tree 200 enables fault detection and management system 100 to locate one or several root causes of any fault in the tree by traversing the children of that fault and compiling the leaf fault(s) that indicate a problem. Fault tree 200 as a whole also embeds the entire diagnosis process. By traversing the entire sub-tree of any fault, one can compile a complete log of the steps taken and the results of tests performed to diagnosis the fault. Thus, a presentation process 70 can display the root cause(s) of a fault and/or can present a diagnosis log allowing an end user to verify the process.

Referring to FIG. 3, fault diagnosis engine 101 manages the structure of fault tree 200. Fault handlers 150 provide the contents and semantics of the tree. For each fault in fault tree 200, one or more fault handlers 150 are triggered. Fault handler 150 may perform a specific test on the fault and provide a result of the test to the engine or it may create one or more child faults to find a possible cause. Each new child fault creates a new branch in the fault tree. A branch may be represented preferably by a fault association called MaybeCausedBy shown in FIG. 6.

Tester fault handler 152 performs a direct test and a diagnoser fault handler 154 spawns possible suspect faults. Other types of handlers may correlate similar faults or perform impact analysis. Fault handler 150 could be both test fault handler 152, and diagnoser fault handler 154, which can perform a test, provide a result and also attempt to find the cause. Preferably, a handler is not both test fault handler 152 and diagnoser fault handler 154. Furthermore, if diagnoser fault handler 154 does not provide a direct result for a fault object, a composite result is computed from the results of the fault's children (shown, for example, in FIG. 6). Fault detection engine 101 or diagnoser fault handler 154 may compute the composite result according to rules provided below.

Referring to FIG. 6A, fault A is entered into the system by detector 130 as a problem. Also referring to FIG. 5A, the fault begins in initial state 180 and is transitioned to detected state 182. Diagnoser fault handler 154 creates two child faults, B and C. A MaybeCausedBy association is created between faults A-B and A-C, as shown in FIG. 6A.

The current result state for each fault is shown in the upper right corner of each fault box. The result state for faults B and C is indicated by a question mark (?) because a result has not yet been computed. Since faults B and C are unverified, the engine transitions these faults to testing state 184. Diagnoser fault handler 154 creates for fault B new faults D and E, and creates for fault C new faults F and G. Next, fault diagnosis engine 101 triggers tester fault handlers 154 for faults D, E, F, and G and these testers assert results shown in FIG. 6B. Since results have been computed for faults D, E, F, and G, fault diagnosis engine 101 transitions these faults to the completed state 186 (FIG. 5A). Next, fault diagnosis engine 101 computes a composite result for faults B and C according to the following default rules for composite result computation:

1. If any child fault result state is PROBLEM, then the parent fault's result state is PROBLEM.
2. If all child fault result states are NO_PROBLEM, then the parent fault's result is NO_PROBLEM.
3. Otherwise, the parent fault's result is UNKNOWN.

Using the above rules, the composite result for fault B is NO_PROBLEM and the composite result for fault C is PROBLEM. Thus fault F is the cause of fault C. The system indicates this causality with another association called CausedBy as shown in FIG. 6C.

The fault diagnosis is now complete on faults B and C so they transition to completed state 186. The composite result for A is PROBLEM since the result state for fault C is PROBLEM and a CausedBy association is created between A and C as shown in FIG. 6C.

As described above, the system executed root cause analysis and determined the root cause for symptomatic fault A is fault F. The diagnosis log for fault A shows that the conditions tested for faults D and E did not indicate a problem and that a result for fault G could not be determined, possibly because of the problem on fault F.

If the resulting fault tree did not find a root problem, then the composite result for fault A would indicate NO_PROBLEM. Such result would contradict the original assertion of a PROBLEM. In this case, the engine would throw out the composite result and leave the original PROBLEM result. Such a problem may have been intermittent and resolved itself quickly, or the detector was faulty, or the diagnosis was incomplete, perhaps requiring additional testing and diagnosis.

Figure 7:
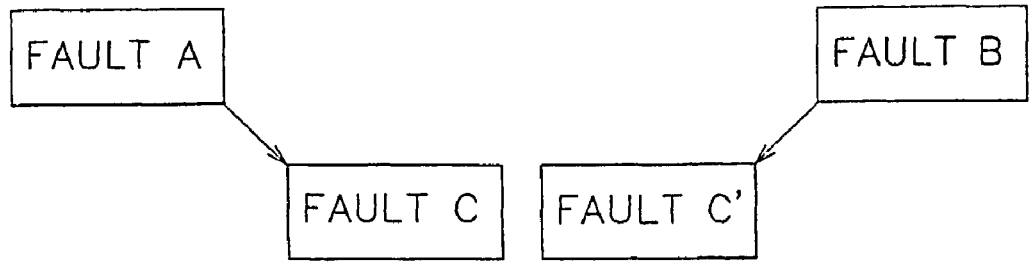

Referring to FIG. 7, according to another situation, multiple symptomatic faults may be caused by the same root problem. This may result in portions of multiple fault trees being identical, that is the diagnosis for multiple symptomatic faults would create the same faults with possibly the same results. Consider two symptomatic faults, A and B shown in FIG. 7. Both faults enter the system at the same time and fault handlers for both faults A and B attempt to create same fault C. The engine can handle this scenario in several different ways shown in FIGS. 7 and 7A. A simple implementation would create two copies of fault C, one for each fault tree. Each fault tree would only be aware of its copy and, thus, each copy of fault C would be diagnosed separately. This is depicted in FIG. 7 with C being the copy. The above approach may result in tests being performed for the same condition twice, which may not be desirable for performance reasons.

Alternatively, the system creates two copies of fault C but "reuses" the results of test(s). For example, consider that fault C is created first and subsequently tested. A short time later fault C' is created. Instead of performing the same test again, the engine would use the test result from fault C for fault C'. A drawback to this approach, however, is that, depending on the semantics of the test, a significant amount of time may have passed such that the result computed for fault C may be invalid for fault C', that is the result for C is now "stale". To alleviate this issue, the system may employ certain rules or heuristics to determine when and if a test result can be reused. The system may only reuse the results from certain tests or may only reuse a result depending on its state. For example, using the test result states defined above in the preferred implementation, a NO_PROBLEM result may always be re-tested but a PROBLEM or UNKNOWN result may be reused regardless of the time elapsed. The engine may also "age" test results. For example, if fault C' occurs within a certain amount of time after fault C as determined by some heuristic "aging" factor, then the result for C can be used. Otherwise fault C' is re-tested. An "aging" factor may be defined system-wide or an "aging" factor may be specified per fault type or per test. A system implementation may utilize only one set of rules or heuristics for test result reuse or may use a combination of approaches.

Figure 7A:
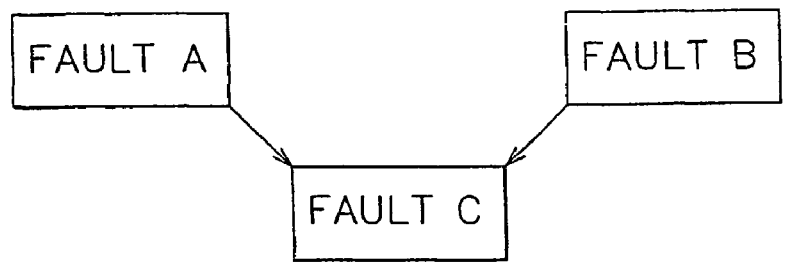

FIG. 7A depicts another approach to handling identical fault tree portions or sub-trees is to share sub-trees amongst multiple symptomatic faults. In this embodiment, instead of multiple fault super-trees maintaining their own copy of a particular sub-tree, the super-trees would "intersect" at certain faults and share a common sub-tree. Therefore fault C is shared by faults A and B.

Thus, faults A and B would share fault C and its associated test result(s). A similar issue exists, however, regarding "stale" test results, as described above. Similar rules or heuristics can be applied here as well. If fault B intersects with fault C some time after fault A, these rules can be applied to determine if fault C needs to be re-tested. FIG. 7B illustrates a more complete example using the test result states defined above in the preferred implementation. In the diagram of FIG. 7B, faults A and F intersect at fault C and share its PROBLEM test result. The root cause of both A and F is fault D.

According to another important aspect, fault management and diagnosis system 100 enables resolution and possible re-evaluation of a previously detected problem. The system reacts when a monitoring system detects that a problem has been resolved or no longer exists. The system may remove faults and notify presentation 70 of the resolution. This process can be automated and/or require user intervention. If a user instructs the system that a fault has been resolved, the system could merely remove the fault or could choose to re-evaluate the condition represented by the fault and verify resolution.

The fault tree hierarchy can facilitate resolution and re-evaluation of faults. The system provides a mechanism allowing an observer or detector to specify that a fault originally entered into the system as a problem has subsequently been resolved. Additionally, problems detected by internal handlers in the system may monitor the condition to detect resolution. When a fault is deemed resolved, the engine would re-test all the faults, if any, in the sub-tree of the resolved fault and propagate the new computed result "up" to its parent fault. The parent fault would then re-test and propagate its new result. This process continues until the entire tree has been re-evaluated. This may result in the entire tree being resolved or the isolation of a new cause for the root symptomatic fault if it is determined that the root symptom is still a problem even though the original root cause has been resolved.

As shown in FIG. 6C, the system diagnosed fault F as the root cause of symptomatic fault A. Assume the fault handler that tested fault F is monitoring the condition and, some time later, detects that the problem no longer exists. A new test result is asserted for fault F with a state of NO_PROBLEM that contradicts the original PROBLEM result shown in FIG. 6C. Fault diagnosis engine 101 then makes an "inference" on the parent fault of fault F with the new result state of fault F. An inference on a fault is not an assertion of a new result but a suggestion used to determine if the fault needs to be re-evaluated. If the inferred result state contradicts the current result state for the fault, the fault is re-evaluated. In this case, the engine infers a result state of NO_PROBLEM on the parent fault of F, fault C. Since this inference contradicts the current result state, PROBLEM, fault C is re-evaluated. Fault diagnosis engine 101 transitions the processing state of fault C from completed state 186 back to testing state 184 (shown in FIG. 5).

Fault diagnosis engine 101 re-triggers diagnoser fault handler 154 for fault C (FIG. 8), which in turn attempts to re-create fault F and fault G. However, since faults F and G already exist in the current tree, no new faults are created. The engine then infers NO_PROBLEM on faults F and G as shown in FIG. 8A. There is a contradiction for fault G, since its current result state is UNKNOWN, so it is transitioned back to testing state 184, but fault F remains in completed state 186 since no contradiction occurs and a new result was just asserted for it. Assume tester fault handler for fault G finds that G has been resolved and asserts the NO_PROBLEM result state. Diagnosis for fault G is complete so its processing state is changed to completed state 186. The composite result computed for fault C would now be NO_PROBLEM and the CausedBy association between C and F removed, as shown in FIG. 8A.

The new result state for fault C is now propagated to fault A, which causes A to transition back to testing state 184. However, since both child faults B and C are NO_PROBLEM, the composite result for fault A now becomes NO_PROBLEM and the causality association between faults A and C is removed, as shown in FIG. 8B.

The entire fault tree, shown in FIG. 8B, was re-evaluated except for the sub-tree rooted at fault B, which was not re-evaluated because its original test result state was NO_PROBLEM and no contradiction occurred (see FIG. 6C). If the engine employs an aging factor for test results, as described above, then fault B could be re-evaluated if its result is deemed stale.

In the embodiment performing aging factor testing, fault detection engine 101 re-evaluates fault results deemed stale. Specifically as shown in FIG. 8B, fault detection engine 101 re-evaluates fault B's sub-tree. Assume that fault E is re-tested and the result is NO_PROBLEM, but fault D re-tests with a new result of PROBLEM. The composite result for fault B is now also PROBLEM and a causality association is created between faults B and D (FIG. 8C). Fault C is also re-evaluated. Fault detection engine 101 generates a composite result for fault A according to the above rules. Referring to FIG. 8D, based on results of faults B and C, fault A is PROBLEM as determined in the fault tree of FIG. 6C, but now its root cause is fault D.

Figure 9:
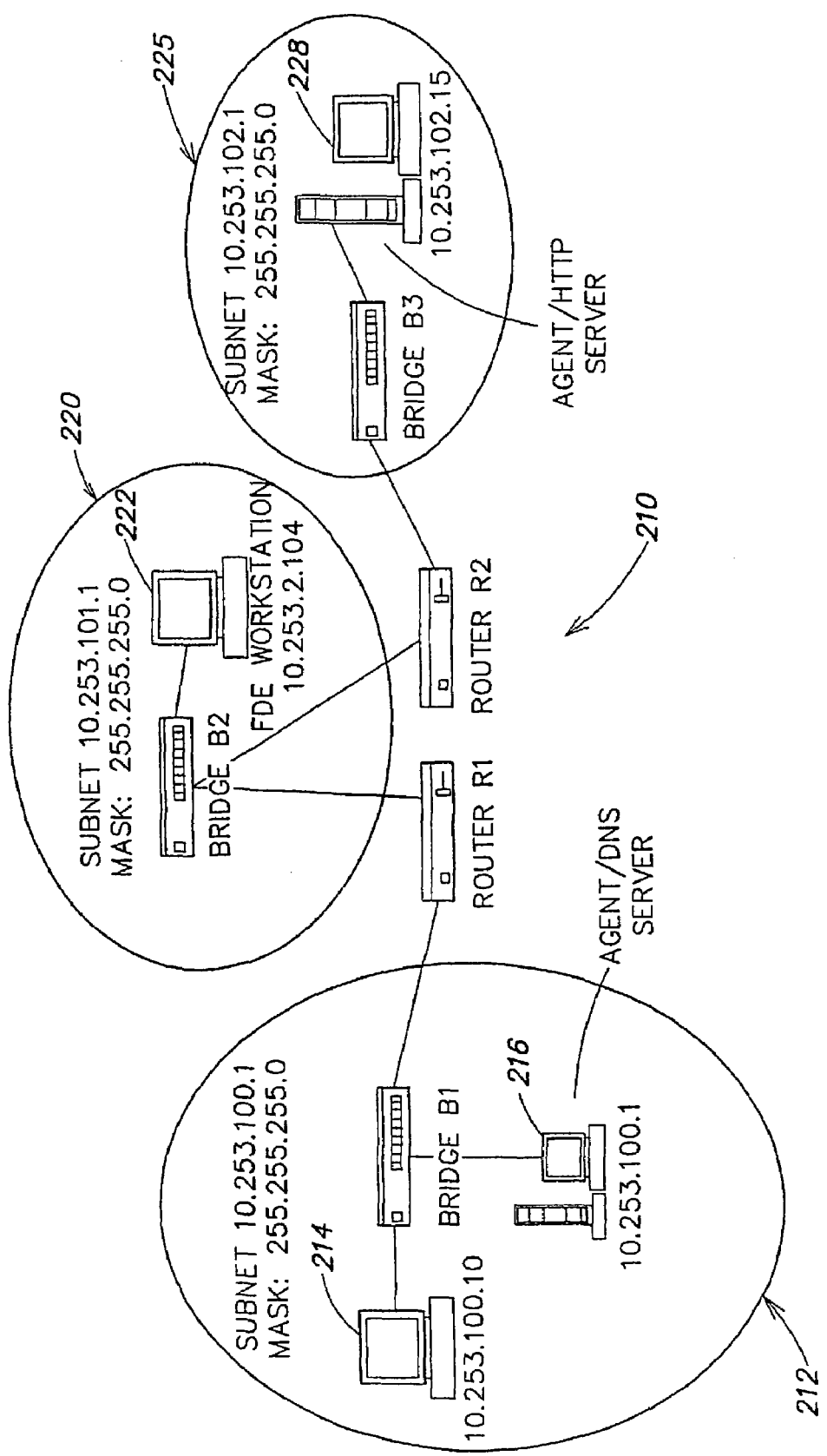
FIG. 9 illustrates a sample network analyzed by the fault diagnosis and management system.

The above-described fault diagnosis and management process may be applied to any system. In the following example, the above-described fault diagnosis and management process is applied to diagnosing a fault that occurred in a communications network 210 shown in FIG. 9. Communications network 210 includes a router R1 connecting a subnet 212 and a subnet 220, and includes a router R2 connecting a subnet 220 and a subnet 225. Subnet 212 includes a bridge B1, a workstation 214, and a server 216. Subnet 220 includes a bridge B2 and a workstation 222, and subnet 225 includes a bridge B3 and a HTTP server 228. Workstation 214 includes client agent with IP address 10.253.100.10. The client agent is monitoring HTTP server 228 with IP address 10.253.102.15 by periodically requesting an HTTP web page. The fault diagnosis and management process is running on workstation 222 at 10.253.2.104. A DNS server resides on machine 216 having IP address 10.253.100.1.

For example, the client agent 214 tries to load an HTML page with the URL "www.acme.com/index.html" from HTTP server 228, but receives no response. The client agent, acting as fault detector 130, sends information about the failure to fault object factory 110. Fault object factory 130 creates a fault object of type HTTPLostFault from the information provided and its processing state is set to the detected state 182 (FIG. 5).

Figure 10:
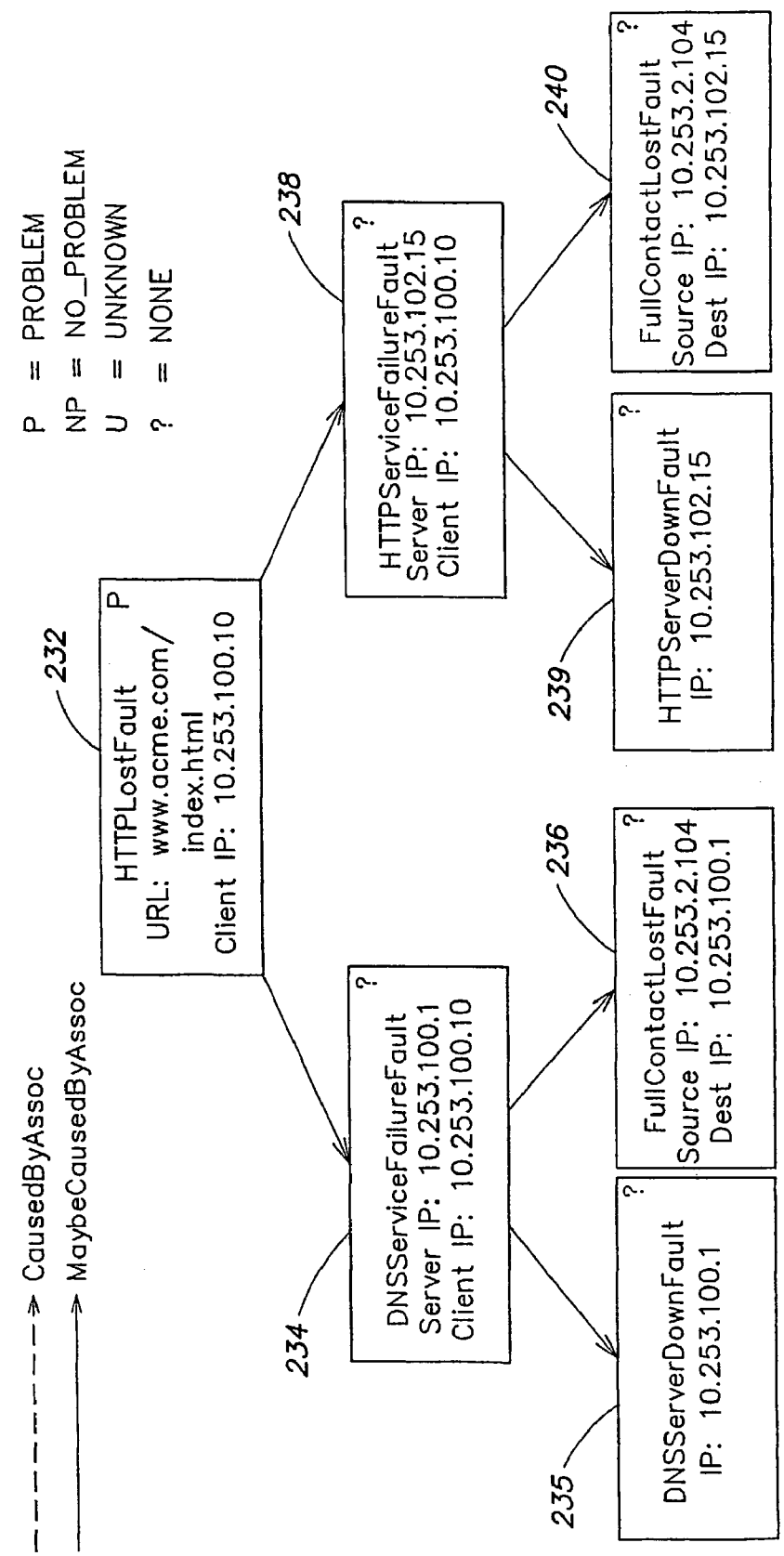
FIGS. 10, 10A and 10B are block diagrams of a fault tree created by the fault diagnosis and management system analyzing the sample network of FIG. 9.

As shown in FIG. 4, fault diagnosis engine compiles a list of fault handlers (step 172) registered for the HTTPLostFault type. Instep 176, diagnoser fault handler 154 registered for the HTTPLost fault type is triggered. Diagnoser fault handler checks for two possible causes of the problem: a DNS service failure and an HTTP service failure. The DNS is checked because name resolution may be needed on the client side to determine the IP address of the HTTP server. Thus, the diagnoser creates two faults: one of type DNSServiceFailure fault 234 and the other of type HTTPServiceFailure fault 238, as shown in FIG. 10.

For DNSServiceFailure fault 234, diagnoser fault handler 154 creates two faults: one of type DNSServerDown fault 235 and the other of type FullContactLost fault 236. Similarly, diagnoser fault handler 154 for the HTTPServiceFailure fault 238 creates two faults: one of type HTTPServerDown fault 239 and the other of type FullContactLost fault 240, as shown in FIG. 10.

For the HTTPServerDown fault 239 tester fault handler 152 makes a query to agent running on HTTP server machine 228 at IP 10.253.102.15 to verify that the HTTP server process is running. Assume HTTP server 228 is running so the result state of the test is set to NO_PROBLEM. Tester fault handler for the FullContactLost fault 240, child of the HTTPServiceFailure fault 238, performs an ICMP echo request (or ping) from the management station 222 at 10.253.2.104 to HTTP server machine 228 at 10.253.102.15. Assume a response is received from the ping, thus the result state of this test is also NO_PROBLEM. At this point, fault detection engine 101 has verified that the management station can contact the HTTP server machine 228 and the HTTP service is available.

Figure 10A:
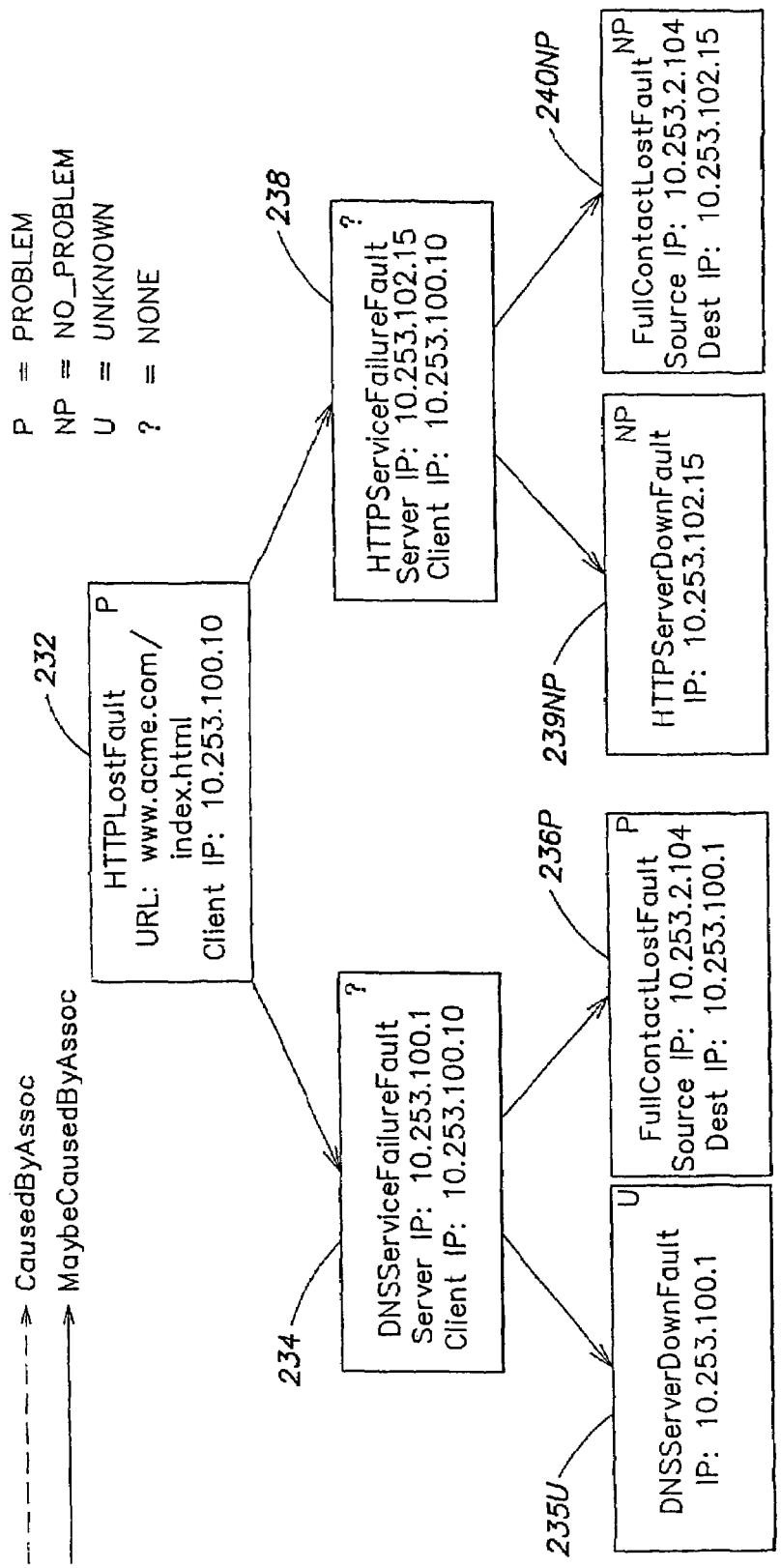

Similarly, tester fault handler 152 for the DNSServerDown fault 235 makes a query to the agent on DNS server machine 216 at IP 10.253.100.1 to verify that the DNS server process is running. In this case, for example, no response is received from the agent on machine 216. As shown in FIG. 10A, tester fault handler 152 asserts a test result with state UNKNOWN on DNSServerDown fault 235 because it could not be positively determined if the DNS service is available or not. The server process could be running but a network failure may be preventing access from the management station. Next the FullContactLost fault tester handler 152 is also triggered for the other FullContactLost fault from source IP 10.253.2.104 to Destination IP 10.253.100.1, the DNS server 216. Assume the DNS server 216 is down, this ping request fails and no response is received. Tester fault handler 152 asserts a result with state PROBLEM as shown by 236P in FIG. 10A.

Figure 10B:
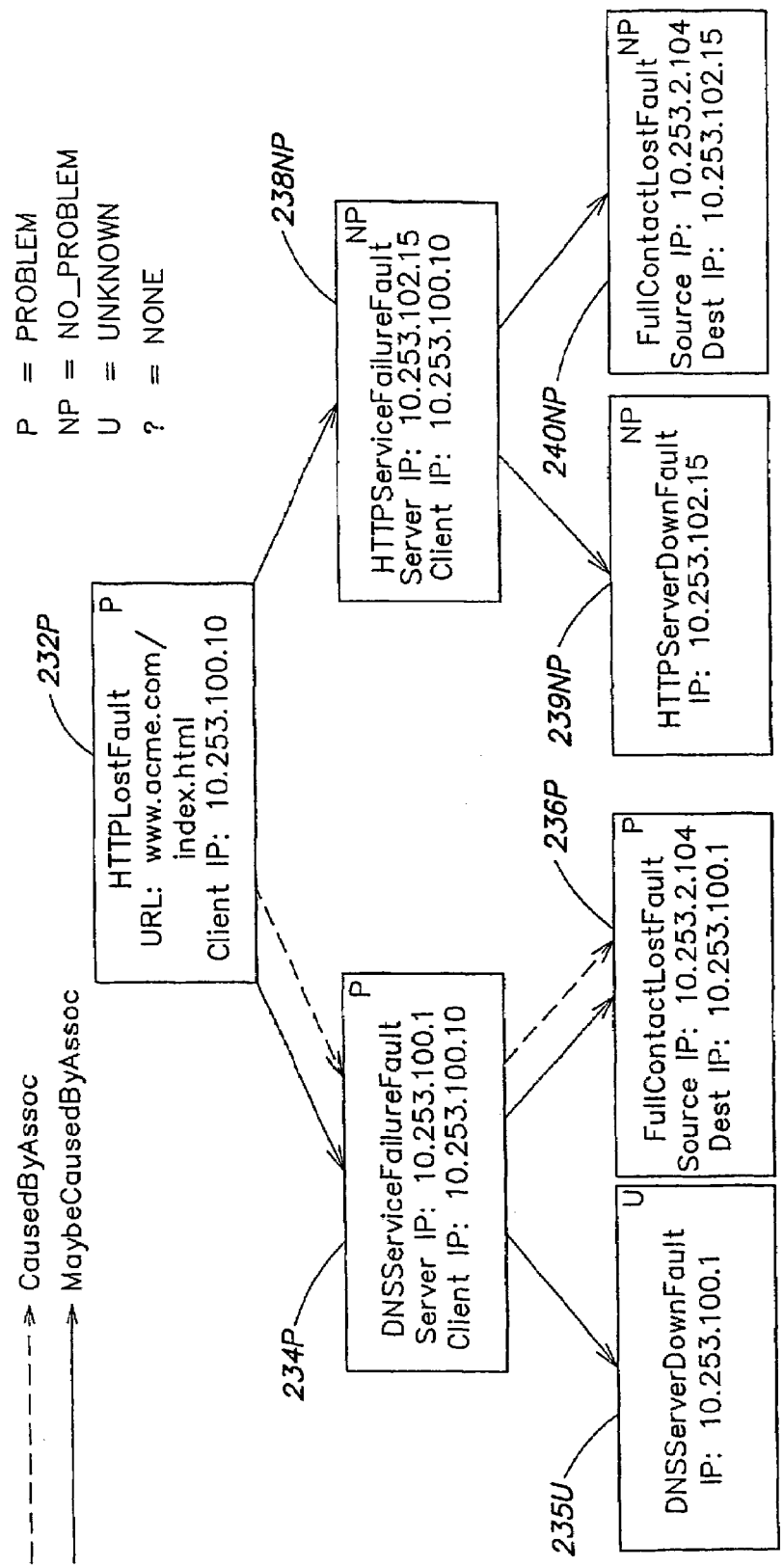

As shown in FIG. 10B, according to the rules stated above, the composite result state for the HTTPServiceFailure fault 238NP is NO_PROBLEM, and the composite result state for the DNSServiceFailure fault 234P is PROBLEM. A CausedBy association is created between the DNSServiceFailure fault 234P and FullContactLost fault 236P.

A composite result state of PROBLEM is computed for the root HTTPLostFault, which agrees with the original PROBLEM assertion, and a CausedBy association is created between the HTTPLost fault 232P and the DNSServiceFailure fault 234P. Thus, the root cause of the HTTP request failure is that the DNS server machine is down, preventing name resolution of the HTTP server machine.

Additional, more complex diagnosis can be performed to check for other possible causes, such as a bad URL, configuration problems on the client side such as invalid TCP/IP configuration for DNS and the default gateway, and hardware problems on the server side such as a hard disk failure. Diagnoser fault handler 154 can be implemented for the FullContactLost fault to trace a path between the source and destination and create faults. Such a path dependent test tests the network devices and ports that the data traverses, at both Layer 2 and Layer 3, to further isolate a problem as is described in PCT application (docket No. A3-03WO) entitled "Systems and Methods for Diagnosing Faults in Computer Networks" filed on May 7, 2001, which is incorporated by reference.

Preferably, the FullContactLost faults 236 and 240 contain the client's IP address as the source instead of the management station's, as in the above example. Thus, the tested path is from the client's perspective. Also, in the above example, the HTTPLost fault 232 was detected by a software agent monitoring the HTTP server. Such a fault could also be injected into the fault diagnosis system via a Help Desk by a user experiencing a problem as described in the co-pending PCT application (docket no A3-05WO) entitled "Help Desk Systems and Methods for use with Communications Networks" filed on May 7, 2001, which is incorporated by reference.

Numerous other embodiments not described in detail here can apply the principles described to particular applications and are within the scope of the claims.

What is claimed is:

1. A method of diagnosing a fault, comprising:
 receiving fault data related to a detected fault; and
 performing a root cause analysis to determine a root cause of the detected fault, wherein performing the root cause analysis includes:

creating at least one fault object using a fault object factory, the fault object factory assembling the received fault data into the at least one fault object;

analyzing the received fault data using one or more diagnoser fault handlers that have registered for the fault object, wherein the one or more diagnoser fault handlers identify one or more constituent faults, each of the constituent faults representing a possible cause of the detected fault; and testing each of the identified constituent faults using one or more tester fault handlers that test each of the identified constituent faults to identify which of the identified constituent faults is a root cause fault that is an actual cause of the detected fault.

2. The method of claim 1, wherein performing the root cause analysis further includes ordering one or more of the diagnoser fault handlers or the tester fault handlers in a prioritized list.

3. The method of claim 1, wherein the diagnoser fault handlers have registered for at least one of a type or a current state of the fault object.

4. The method of claim 3, wherein performing the root cause analysis further includes:
terminating execution of the diagnoser fault handlers when at least one of the diagnoser fault handlers cause a transition to the current state of the fault object; and
triggering execution of one or more diagnoser fault handlers that have registered for the transitioned state of the fault object.

5. The method of claim 4, wherein performing the root cause analysis further includes employing a state transition diagram to determine when the diagnoser fault handler causes the transition to the current state of the fault object.

6. The method of claim 5, wherein the state transition diagram includes at least one of an initial state, a testing state, a detected state, or a completed state of the fault object.

7. The method of claim 1, wherein the tester fault handler determines causality between the constituent faults and the detected fault.

8. The method of claim 1, wherein the fault object factory facilitates re-evaluation of the fault object when at least one of the identified constituent faults or the detected fault have been resolved.

9. The method of claim 1, wherein the fault object factory assembles the fault data into a plurality of fault objects that form a hierarchical fault object tree that represents hierarchical relationships between the detected fault and the identified constituent faults.

10. The method of claim 9, wherein the hierarchical fault object tree includes a hierarchical relationship between a parent fault object and a child fault object indicating that the child fault object may be a cause of the parent fault object.

11. The method of claim 9, wherein testing each of the identified constituent faults includes:
identifying one or more sub-constituent faults for each of the constituent faults, each sub-constituent fault representing a possible cause of one or more of the constituent faults; and
testing each of the sub-constituent faults to identify the root cause fault that is the actual cause of the detected fault.

12. The method of claim 11, wherein the hierarchical fault object tree includes the detected fault at a root fault level, one or more of the identified constituent or sub-constituent faults at one or more intermediate fault levels, and one or more of the identified constituent or sub-constituent faults at a leaf fault level.

13. The method of claim 10, wherein testing the identified constituent faults includes defining the hierarchical relationship between the parent fault object and the child fault object to indicate that the child fault object is the cause of the parent fault object.

14. The method of claim 1, further comprising performing an impact analysis of the root cause, wherein performing the impact analysis includes determining an impact of the root cause on a system from which the fault data was obtained.

15. The method of claim 1, further comprising assigning at least one of a priority or a severity to the fault object.

16. The method of claim 1, further comprising presenting a result of the root cause analysis to a user.

17. The method of claim 1, further comprising providing a user with a recourse to change a system from which the fault data was obtained.

18. A system for analyzing a fault, comprising:
a fault object factory that receives fault data related to a detected fault and assembles the received fault data into at least one fault object; and
a fault diagnosis engine that performs a root cause analysis to determine a root cause of the detected fault, wherein performing the root cause analysis includes:
analyzing the received fault data using one or more diagnoser fault handlers that have registered for the fault object, wherein the one or more diagnoser fault handlers identify one or more constituent faults, each of the constituent faults representing a possible cause of the detected fault; and
testing each of the identified constituent faults using one or more tester fault handlers that test each of the identified constituent faults to identify which of the identified constituent faults is a root cause fault is an actual cause of the detected fault.

19. The system of claim 18, further comprising at least one fault detector that detects the fault in a monitored entity.

20. The system of claim 18, wherein testing each of the identified constituent faults includes:
identifying one or more sub-constituent faults for of the constituent faults, each sub-constituent fault representing a possible cause of one or more of the constituent faults; and
testing each of the sub-constituent faults to identify the root cause fault that is the actual cause of the detected fault.

21. The system of claim 20, wherein the fault object factory assembles the received fault data into a plurality of fault objects that form a hierarchical fault object tree, the hierarchical fault object tree including the detected fault at a root fault level, one or more of the identified constituent or sub-constituent faults at one or more intermediate fault levels, and one or more of the identified constituent or sub-constituent faults at a leaf fault level.

* * * * *